US012036153B2

(12) United States Patent
King et al.

(10) Patent No.: US 12,036,153 B2
(45) **Date of Patent: *Jul. 16, 2024**

(54) STRETCHER WITH INTEGRATED CHILD RESTRAINT

(71) Applicant: Indiana Mills & Manufacturing, Inc., Westfield, IN (US)

(72) Inventors: Jeffrey Alan King, Markleville, IN (US); Christopher Geist, Westfield, IN (US); Amie Barnes, Kempton, IN (US); Soren Balzer Sibbesen, Westfield, IN (US); Douglas Wayne Bittner, Indianapolis, IN (US); Chris P. Jessup, Sheridan, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 216 days.

This patent is subject to a terminal disclaimer.

(21) Appl. No.: 17/650,186

(22) Filed: Feb. 7, 2022

(65) Prior Publication Data

US 2022/0160557 A1 May 26, 2022

Related U.S. Application Data

(62) Division of application No. 16/533,947, filed on Aug. 7, 2019, now Pat. No. 11,241,344.

(Continued)

(51) Int. Cl.

*A61G 1/044* (2006.01)
*A47D 15/00* (2006.01)

(Continued)

(52) U.S. Cl.

CPC .......... *A61G 1/044* (2013.01); *A47D 15/005* (2013.01); *A61G 3/0875* (2013.01);

(Continued)

(58) Field of Classification Search

None

See application file for complete search history.

(56) References Cited

U.S. PATENT DOCUMENTS 4,977,630 A 12/1990 Oswalt et al.
5,014,724 A 5/1991 Miller (Continued)

OTHER PUBLICATIONS https://www.youtube.com/watch?v=isEsBn2JnuM, "Suwanne County Fire Rescue Training Division", "Car Seat on a Stretcher" May 2016 (Year: 2016).*

(Continued)

*Primary Examiner* — Adam C Ortiz

(74) *Attorney, Agent, or Firm* — Woodard, Emhardt, Henry, Reeves & Wagner, LLP

(57) ABSTRACT

A cot includes a patient platform that supports a frame, a patient support assembly, and a pad. The cot further includes a lift system that is coupled to a transport system that includes a cot retainer. The patient support assembly includes a headrest, backrest, seat, and leg rest. In some forms, a child restraint assembly is incorporated into the various parts of the patient support assembly to allow safe transport of children in an ambulance. The child restraint assembly is adjustable to accommodate the size of the child being transported. In other forms, the child restraint assembly is incorporated into the pad. The various embodiments envision a child restraint assembly that is easily accessible to emergency medical professionals.

18 Claims, 18 Drawing Sheets

Related U.S. Application Data

(60) Provisional application No. 62/746,787, filed on Oct. 17, 2018, provisional application No. 62/715,468, filed on Aug. 7, 2018.

(51) Int. Cl.
*A61G 1/02* (2006.01)
*A61G 3/08* (2006.01)

(52) U.S. Cl.
CPC .......... *A47D 15/006* (2013.01); *A47D 15/008* (2013.01); *A61G 1/02* (2013.01)

(56) References Cited

U.S. PATENT DOCUMENTS

| | | | | |
|---|---|---|---|---|
| 5,195,801 | A | 3/1993 | Franck et al. | |
| 5,400,448 | A * | 3/1995 | Zwickey .............. | A61H 31/008 5/628 |
| 5,496,092 | A * | 3/1996 | Williams ............. | B60N 2/2812 297/256.13 |
| 5,860,176 | A | 1/1999 | Norberg | |
| 5,915,787 | A | 6/1999 | Brookman | |
| 6,089,662 | A | 7/2000 | Lambert et al. | |
| 6,840,577 | B2 | 1/2005 | Watkins | |
| 7,029,067 | B2 | 4/2006 | Vits et al. | |
| 7,861,341 | B2 | 1/2011 | Ayette et al. | |
| 8,584,280 | B2 | 11/2013 | Shah | |
| 8,667,629 | B2 * | 3/2014 | Mohr ..................... | A61G 1/044 5/655 |
| 8,936,253 | B1 | 1/2015 | Rizzi | |
| 9,192,248 | B2 | 11/2015 | Wigzell et al. | |
| 10,080,693 | B1 | 9/2018 | Scheenstra et al. | |
| 10,085,902 | B2 | 10/2018 | Chia et al. | |
| 2004/0045089 | A1 | 3/2004 | Zucker et al. | |
| 2004/0080172 | A1 | 4/2004 | Mitchell et al. | |
| 2007/0251011 | A1 | 11/2007 | Matta et al. | |
| 2008/0086817 | A1 * | 4/2008 | Zucker ................. | A61G 7/0504 5/603 |
| 2008/0168603 | A1 * | 7/2008 | Ayette .................... | A61G 1/044 5/628 |
| 2014/0084651 | A1 * | 3/2014 | Coman .............. | B64D 11/0647 297/464 |
| 2018/0289568 | A1 | 10/2018 | Allen | |

OTHER PUBLICATIONS https://www.youtube.com/watch?v=RnVD4bPHHDY "Queensland Ambulance Service", Pedimate: Multi-stretcher child harness, Apr. 2014 (Year: 2014).*

Stryker, Stryker Power-PRO XT Operations/Maintenance Manual Retrieved from the Internet: https://techweb.stryker.com/EMS/Ambulance_Cots/6506/1205/6506-009-001C.1.pdf, 208 pages, Aug. 7, 2019.

Stryker, Stryker Power-PRO XT Powered ambulance stretcher Retrieved from the Internet: https://www.stryker.com/us-en/emergency-care/products/power-pro-xt.html, 4 pages, Aug. 7, 2019.

* cited by examiner

STRETCHER WITH INTEGRATED CHILD RESTRAINT

CROSS-REFERENCE TO RELATED APPLICATIONS

This application is a divisional of U.S. patent application Ser. No. 16/533,947, filed Aug. 7, 2019, which is hereby incorporated by reference. U.S. patent application Ser. No. 16/533,947, filed Aug. 7, 2019, claims the benefit of U.S. Patent Application No. 62/746,787, filed Oct. 17, 2018, which are hereby incorporated by reference. U.S. patent application Ser. No. 16/533,947, filed Aug. 7, 2019, claims the benefit of U.S. Patent Application No. 62/715,468, filed Aug. 7, 2018, which are hereby incorporated by reference.

BACKGROUND

Patient safety during transportation in ambulances, helicopters, or other emergency vehicles is always of the upmost concern. For instance, ambulances can travel at high speeds through intersections which in turn can increase the risk of accidents. While the stretcher may be secured to the floor of the ambulance, the patient may not be secured. When lying on a stretcher, a patient is not in a position to brace themselves during an impact or even be aware of an oncoming accident. Restraint systems, such as harness systems, have been developed to secure adult patients to the stretcher in order to protect the patient during an accident or for other reasons. However, these adult restraint systems are not properly sized and configured for children. Given child emergencies are less common as compared to adults, having a separate child-sized stretcher with a child-sized restraint system is not practical for any number of reasons.

Thus, there is a need for improvement in this field.

SUMMARY

Most ambulance stretchers used in emergency vehicles are designed with adults in mind. Some child restraint systems for stretchers have been proposed in which a separate car seat or other child restraint is attached to the stretcher such as through straps. However, it was discovered that these separate child restraints are generally not used in practice. In most medical emergencies, every second counts. The time it takes to locate and install one of these child restraint systems takes precious time away from treating patients. Emergency vehicles, like ambulances or medivac helicopters, typically have tight cabin spaces such that there is little extra room for these separate child restraint systems. Since these systems are only required occasionally, the child restraint system may be stowed at inconvenient locations within the vehicle or even outside of the vehicle. As a result, the child restraint system may not be available when the child is first loaded onto the stretcher.

To address these as well as other issues, a unique child restraint system has been developed for integration into a stretcher. In one example, the child restraint system is integrated into a patient platform of the stretcher. The child restraint system has a low profile such that the system is able to be readily stowed within the stretcher, and the system is configured for easy deployment when needed. Moreover, the child restraint system is designed to not interfere with the use of the adult restraint systems of the stretcher. By being integrated into the stretcher, the child restraint system is always available, especially at the location where the child is first loaded onto the stretcher. The child restraint system is also designed to add very little extra weight to the stretcher. Children typically have lower musculature strength which can be detrimental during an impact. The system is further designed to position the child in a more upright rear-facing position that more widely distributes and dissipates the force of the impact.

In one variation, the child restraint system is flipped and stowed directly underneath a headrest and/or backrest of the stretcher. To deploy, the child restraint system is flipped out and rotated from the backrest. In another variation, the child restraint system is flipped over from the bottom to the top of a torso section of the stretcher. The child restraint system in other variations includes an indexing bar that adapts the adult restraints for a child. In still yet other variations, the child restraint system is stowed under a mattress pad of the stretcher. The pad is flipped or rolled to expose the child restraint system. The child restraint system in further variations is integrated into the pad of the stretcher.

Aspect 1 generally concerns a system that includes a stretcher having an integrated child restraint system.

Aspect 2 generally concerns the system of any previous aspect in which the stretcher has a patient platform with the child restraint system integrated in the patient platform.

Aspect 3 generally concerns the system of any previous aspect in which the patient platform has a backrest where the child restraint system is integrated.

Aspect 4 generally concerns the system of any previous aspect in which the child restraint system includes a child seat assembly.

Aspect 5 generally concerns the system of any previous aspect in which the child seat assembly is rigid to support a patient on the patient platform.

Aspect 6 generally concerns the system of any previous aspect in which the child seat assembly has a hinge coupling the child seat assembly to a frame of the patient platform.

Aspect 7 generally concerns the system of any previous aspect in which the hinge is configured to allow a flipping motion of the child seat assembly during deployment and stowing.

Aspect 8 generally concerns the system of any previous aspect in which the hinge includes a ball joint.

Aspect 9 generally concerns the system of any previous aspect in which the child seat assembly includes a child restraint backrest and a child restraint seat pivotally connected to the child restraint backrest.

Aspect 10 generally concerns the system of any previous aspect in which the patient platform has a frame with a crossbar configured to support the child seat assembly in a child restraint cavity of the frame.

Aspect 11 generally concerns the system of any previous aspect in which the child seat assembly has a crossbar coupler configured to couple the child seat assembly to the crossbar.

Aspect 12 generally concerns the system of any previous aspect in which the crossbar coupler includes one or more crossbar pins extending from an end of the child restraint backrest.

Aspect 13 generally concerns the system of any previous aspect in which the child restraint seat includes a seat latch mechanism configured to retain the child restraint seat in an open position.

Aspect 14 generally concerns the system of any previous aspect in which the seat latch mechanism includes one or more clip loops.

Aspect 15 generally concerns the system of any previous aspect in which the child seat assembly includes a child harness that includes one or more belts and a buckle.

Aspect 16 generally concerns the system of any previous aspect in which the child restraint seat includes a belt guide system in which the belts are received.

Aspect 17 generally concerns the system of any previous aspect in which the belt guide system includes a belt shield that defines one or more guide cavities in which the belts are received.

Aspect 18 generally concerns the system of any previous aspect in which the child restraint backrest defines one or more belt grooves in which a portion of the belts are received.

Aspect 19 generally concerns the system of any previous aspect in which the child restraint seat defines a buckle cavity configured to receive the buckle.

Aspect 20 generally concerns the system of any previous aspect in which the stretcher includes an adult harness that is separate from the child harness.

Aspect 21 generally concerns the system of any previous aspect in which the stretcher includes a pad configured to cover the child restraint system when the child restraint system is stowed.

Aspect 22 generally concerns the system of any previous aspect in which the stretcher is a gurney.

Aspect 23 generally concerns the system of any previous aspect in which the gurney includes a patient platform, a transport system, and a lift system coupled between the patient platform and the transport system.

Aspect 24 generally concerns the system of any previous aspect in which the transport system has a retainer configured to secure the gurney in a vehicle during transport.

Aspect 25 generally concerns the system of any previous aspect in which the child restraint system includes a child restraint pad.

Aspect 26 generally concerns the system of any previous aspect in which the child restraint pad is configured to flip during deployment.

Aspect 27 generally concerns the system of any previous aspect in which the entire child restraint pad is configured to flip during the deployment.

Aspect 28 generally concerns the system of any previous aspect in which the child restraint system is configured to modify an adult harness for use by a child.

Aspect 29 generally concerns the system of any previous aspect in which the child restraint system includes an indexing bar to modify belt height of the adult harness.

Aspect 30 generally concerns a method of operating the system of any previous aspect.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
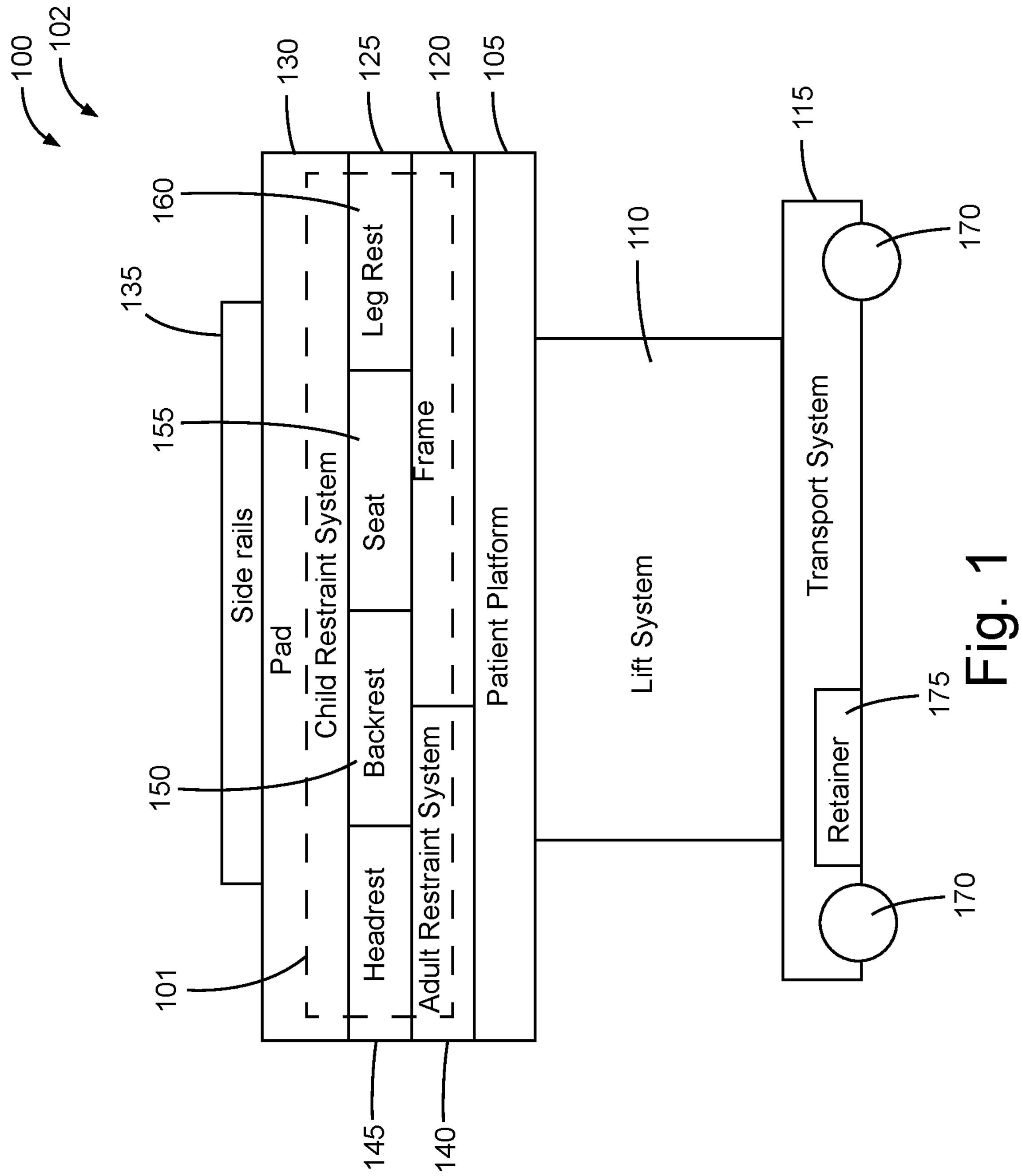
FIG. 1 is a diagrammatic view of a stretcher according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a “100” series reference numeral will likely first appear in FIG. 1, an element identified by a “200” series reference numeral will likely first appear in FIG. 2, and so on.

FIG. 1 shows a diagrammatic view of a stretcher 100 that is designed to be loaded into, moved by, and unloaded from an ambulance or other medical vehicle such as a medivac helicopter. The stretcher 100 is designed to normally carry a patient or other individual requiring medical, psychiatric, or other forms of treatment, but the stretcher 100 can be used in other situations. While the stretcher 100 will be generally described below as being used with a patient, it should be recognized that other types of individuals (or multiple individuals) can be carried and transported with the stretcher 100. As will be further explained below, the stretcher 100 is designed to safely carry both adults and children such as when being transported in the ambulance. The stretcher 100 includes a child restraint system 101 that is integrated into the stretcher 100. The child restraint system 101 has a low profile such that the child restraint system 101 is able to be readily stowed within the stretcher 100, and the child restraint system 101 is configured for easy deployment when needed. Moreover, the child restraint system 101 is designed to not interfere or minimally interfere with the use of other parts of the stretcher 100.

In the illustrated example, the stretcher 100 is a gurney 102 that is able to easily move a patient on the gurney 102 in a generally horizontal direction, but the stretcher 100 in other examples can include other types of stretchers, like litters, that require the stretcher 100 to be lifted and carried in order to be moved horizontally. The gurney 102 includes a patient platform 105 that carries the patient, a lift system 110 that is configured to move the patient platform 105 in a general vertical direction, and a transport system 115 that is configured to move the gurney 102 in a general horizontal direction. As shown, the lift system 110 connects the patient platform 105 to the transport system 115. The lift system 110 in one form is able to adjust the distance between the patient platform 105 and lift system 110 so that the overall height of the stretcher 100 can be changed depending on the situation. For example, the lift system 110 can lower the patient platform 105 so that the gurney 102 is able to fit inside a cabin in the back of an ambulance, and the lift system 110 can raise the patient platform 105 when the gurney 102 is moved outside of the ambulance.

The patient platform 105 includes a frame 120, patient support assembly 125, and pad 130. The frame 120 is secured to the lift system 110, and the frame 120 supports the patient support assembly 125. The patient support assembly 125 is configured to support the patient at various positions (e.g., head raised position, feet raised position, etc.). The patient support assembly 125 is typically made of a rigid or stiff material, such as metal or plastic, so as to provide sufficient support of the patient. The pad 130 is designed to provide cushioned support of the patient on the patient support assembly 125. In one example, the pad 130 is in the form of a foam mattress pad, but other types of pads or covers can cover the patient support assembly 125. As will be discussed in greater detail below, all or part of the side rails 135 in certain examples can be removed, repositioned, furled up, and/or rolled up to expose all or part of the child restraint system 101.

In the depicted example, the patient platform 105 includes one or more side rails 135 that reduce the risk of the patient from sliding or rolling off the side of the gurney 102. The side rails 135 are secured to the frame 120. The side rails 135 can be stationary or collapsible type side rails. When for example the side rails 135 are collapsible types, the side rails 135 are able to be lowered when the patient is loaded onto the patient platform 105 and afterwards raised, if needed.

The stretcher 100 further includes an adult restraint assembly 140 that is configured to secure adult patients to the patient platform 105. The adult restraint assembly 140 can be used to secure the patient for any number of reasons. The adult restraint assembly 140 for example can be used to secure an adult or an adult sized person to the stretcher 100 due to safety concerns such as to due to a particular medical condition and/or to protect the patient during an accident when being transported by the emergency vehicle. In one version, the adult restraint assembly 140 includes a harness with one or more straps secured to the frame 120. The harness further can include buckles and strap adjusters for properly securing the adult.

As depicted in FIG. 1, the patient support assembly 125 includes a headrest 145, backrest 150, seat 155, and leg rest 160 generally coupled together in a serial fashion. Usually, but not always, the head and back of the individual rests on the headrest 145 and backrest 150, respectively, when lying on the gurney 102, and the buttocks and legs of the individual respectively rest on the seat 155 and leg rest 160. The headrest 145, backrest 150, seat 155, and leg rest 160 can be coupled together through various joints and/or hinges to facilitate relative positioning of the parts of the patient support assembly 125 which in turn facilitates positioning of the patient on the stretcher 100. For example, the headrest 145 and backrest 150 can be raised at an angle so as to raise the head of a patient. In another example, the seat 155 and leg rest 160 can be angled relative to one another to form an acute angle so as to raise the knees of the patient. The components can be longitudinally extended or retracted to fit differently sized individuals. For instance, the headrest 145 can be extended for taller individuals.

As shown, all or part of the child restraint system 101 can be integrated into the patient platform 105. For instance, the child restraint system 101 can be partially or fully incorporated into the frame 120, patient support assembly 125, pad 130, and/or adult restraint assembly 140. In selected examples, the child restraint system 101 within the patient support assembly 125 can be incorporated into the headrest 145, backrest 150, seat 155, and/or leg rest 160. For instance, the child restraint system 101 in one version is incorporated into the backrest 150 of the patient support assembly 125. The backrest 150 in this version is able to be flipped and unfolded in order to deploy the child restraint system 101 for use. In another version, a portion of the pad 130 is flipped over from the back of the patient support assembly 125 so as to present the child restraint system 101. The child restraint system 101 in still yet other variations modifies the adult restraint assembly 140 so that the adult restraint assembly 140 is now sized for children or youths.

The lift system 110 of the stretcher 100 is capable of supporting the weight of the patient platform 105 as well as the weight of various sized patients, ranging from small children to large adults. Once more, the lift system 110 is operable to control the height of the patient platform 105 relative to the ground.

The lift system 110 can be in a raised position to assist medical personnel in moving a patient from one location to another, or can be in a lowered position to assist medical personnel in loading and unloading the stretcher 100 from an ambulance or other emergency vehicle. The lift system 110 can be powered, unpowered, or can be an x-frame model. However, it should be recognized that other various types of lift systems 110 could be implemented to perform the same function. In other variations, the child restraint system 101 is a soft-good that is stored in a sack attached or integrated in the headrest 145.

Again, the stretcher 100 in the example illustrated in FIG. 1 is in the form of the gurney 102. To facilitate generally horizontal movement, the gurney 102 has the transport system 115. The transport system 115 is designed to assist medical personnel in moving the gurney 102 and to ease the effort of transporting patients. The transport system 115 in the depicted example includes one or more wheels 170 that are configured to roll against the ground, floor, and/or other surface. The transport system 115 in other examples can include other mechanisms for moving the gurney 102 such as casters and/or ball rollers. With the transport system 115, the gurney 102 has a tendency to roll around inside the vehicle which can be quite dangerous. To secure the gurney 102 in a fixed manner in the vehicle, the transport system 115 further includes a cot retainer 175. In one form, the cot retainer 175 includes a cot safety bar that is configured to engage in a releasable manner with a vehicle safety hook mounted to the floor or bed of the vehicle. Alternatively or additionally, the cot retainer 175 includes a cot post that is secured to a rail clamp inside the vehicle. With the cot retainer 175 secured to the vehicle and the child restraint system 101 properly restraining the child patient to the gurney 102, the risk of injury to the patient is reduced during a crash or other incident.

One example of the stretcher 100, and more specifically the gurney 102, will now be described with reference to a stretcher 200 shown in FIG. 2. The stretcher 200 is configured to provide medical professionals with a device that can reconfigure to securely fasten a child or youth for transport in a vehicle such as an ambulance. The stretcher 200 includes the patient platform 105, lift system 110, transport system 115, frame 120, patient support assembly 125, pad 130, side rails 135, and adult restraint assembly 140 generally of the type described before with the differences discussed below. As will be appreciated, the child restraint system 101 in the FIG. 2 stretcher 200 is integrated into the backrest 150 and seat 155 of the patient support assembly 125 in the patient platform 105.

Figure 2:
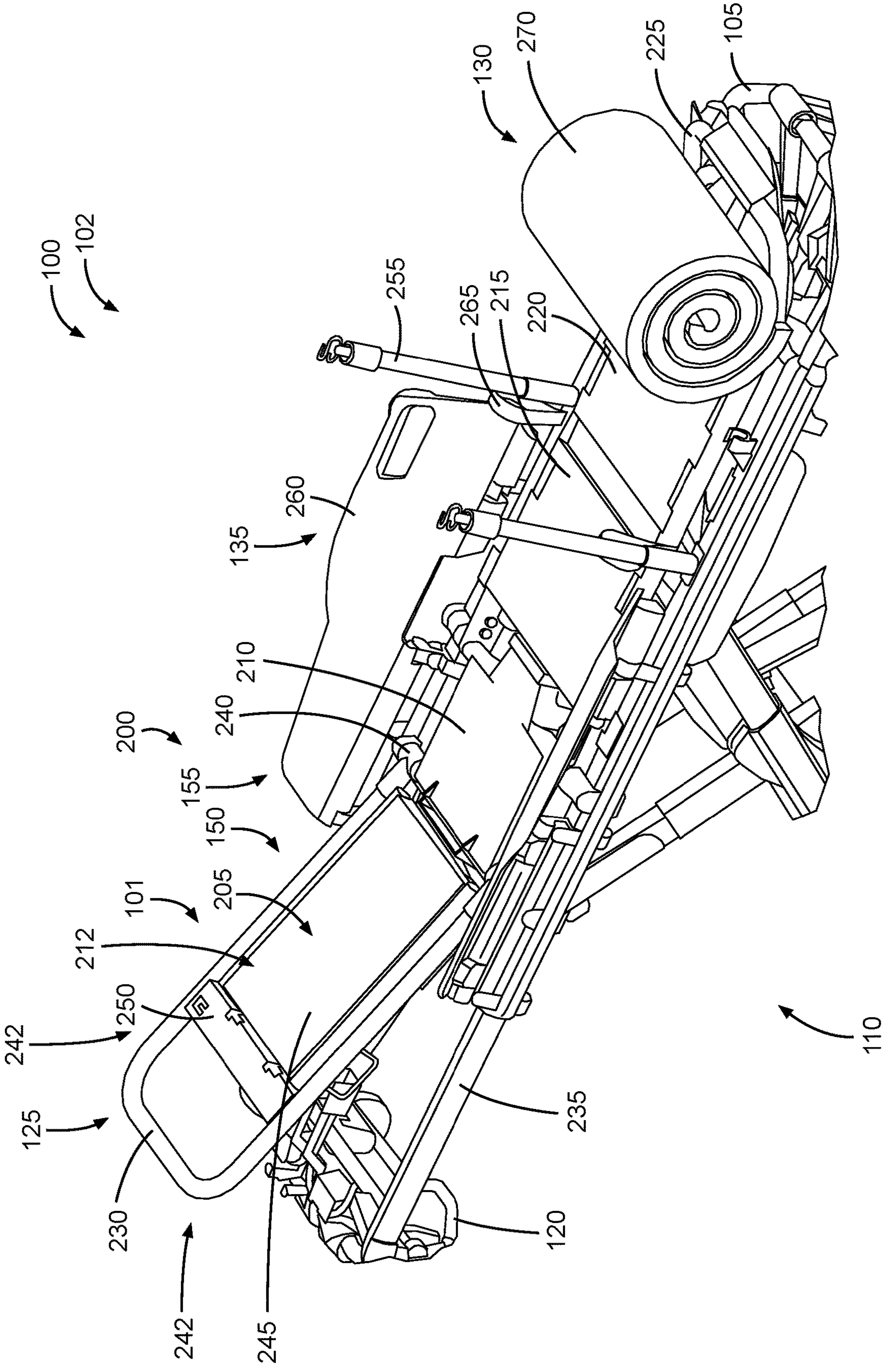
FIG. 2 is an enlarged perspective view of the FIG. 1 stretcher.

Like before, the stretcher 200 in FIG. 2 includes a backrest 205, seat 210, leg rest 215, footrest 220, and footrest bar 225 that are coupled to a frame 230 of a patient platform 235. In one variation, the leg rest 215 and footrest 220 include a Gatch type assembly to facilitate bending of the legs of the patient when in a supine or prone position. The frame 230 further includes a frame hinge 240 for tilting the backrest 205 for various patient-positioning configurations. In one example, the frame hinge 240 includes locking hinges that are able to lock to support the backrest 205 when angled relative to the rest of the patient platform 235. For example, the backrest 205 can be angled so that the patient is positioned in a near sitting position or a supine position.

As noted before, the stretcher 200 has a child restraint system 242 formed integrally with the backrest 205 and seat 210 of the patient platform 235. When deployed, the child restraint system 242 is configured to secure a child to the stretcher 200 in a fashion similar to a vehicle car seat. When not in use, the child restraint system 242 can be stowed inside the patient platform 235. Generally speaking, the child restraint system 242 is configured to be rotated and unfolded during deployment so that a child can be properly secured, and during stowing, the child restraint system 242 is able to be folded and rotated out of the way so that an adult is able to use the adult restraint assembly 140 of the stretcher 200. As shown, the child seat assembly 245 includes a child seat assembly 245 rotatably coupled to the frame 230 and a crossbar 250 that spans across the frame 230 to support the child seat assembly 245. The child seat assembly 245 is configured to unfold so as to form a seat for the child in the child restraint system 242. To facilitate medical treatment, the stretcher 200 includes an extendable intravenous pole 255 for support intravenous (IV) bags or other medical equipment. The stretcher 200 further includes one or more side rails 260 and handle loops 265 along with a pad 270 of the type described before. As shown, the pad 270 can be rolled or otherwise moved out of the way to expose the child restraint system 242.

Figure 3:
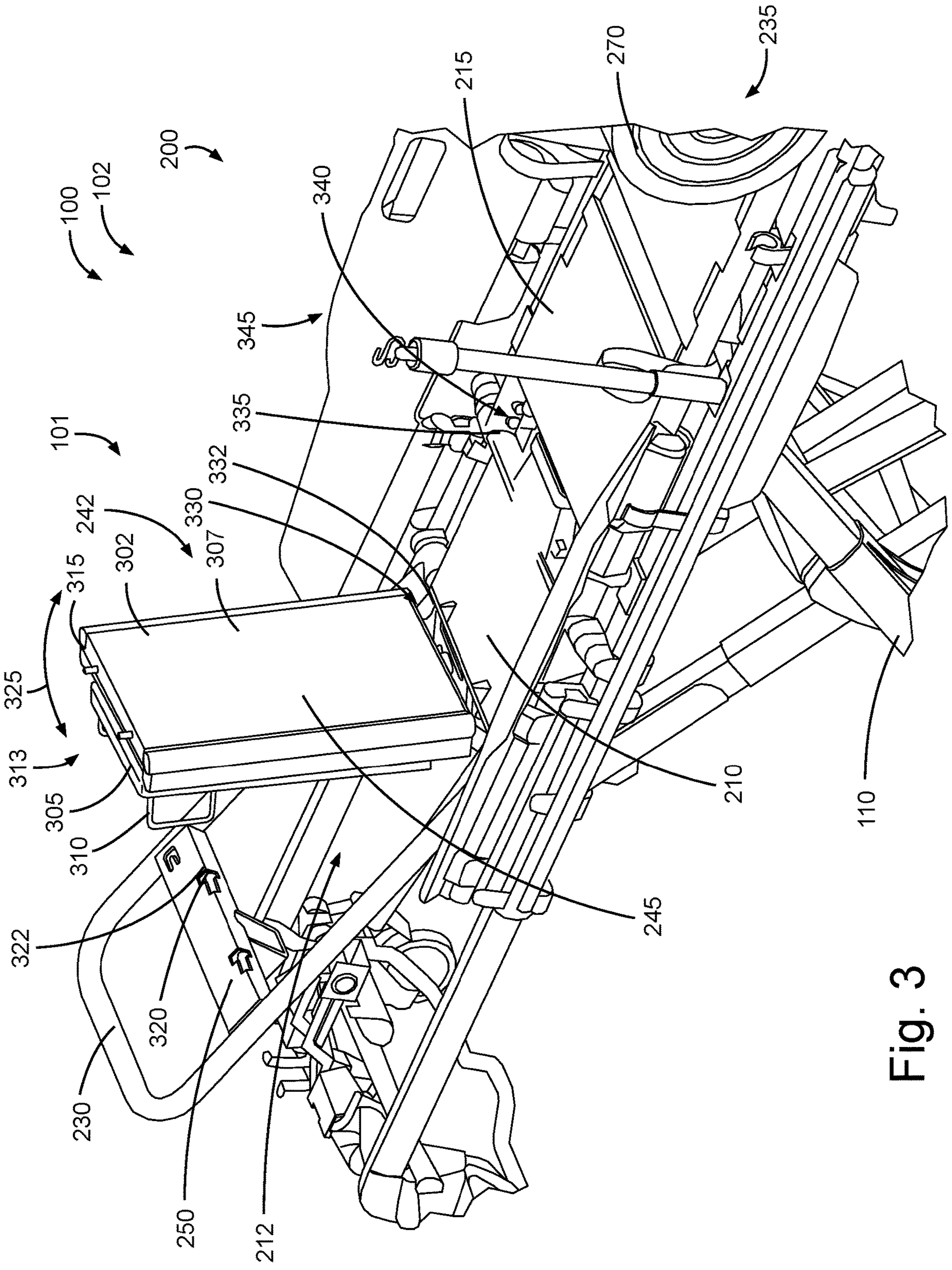
FIG. 3 is an enlarged perspective view of the backrest being removed from the plane of the frame and the crossbar.

Turning to FIG. 3, the child seat assembly 245 of the child restraint system 242 includes a child restraint backrest 302 and a child restraint seat 305 connected to the child restraint backrest 302 in a hinged manner. When the child restraint system 242 is fully deployed, the child restraint backrest 302 and child restraint seat 305 fold out to generally form a seat for a child. The pad surface 307 has a pad surface 307 on which the pad 270 rests when the child restraint system 242 is stowed in the stretcher 200. To make the patient comfortable when lying on the pad 270, the pad surface 307 is substantially flat. Opposite the pad surface 307 when folded, the child restraint seat 305 has one or more clip loops 310 extending therefrom that secure the child restraint seat 305 to the seat 210 when the child seat assembly 245 is unfolded. The frame 230 and crossbar 250 define a child restraint cavity 212 configured to receive all or part of the child seat assembly 245 when stowed and/or deployed.

The child seat assembly 245 has a crossbar coupler 313 that couples the child seat assembly 245 with the frame 230. The crossbar coupler 313 is designed to hold the pad surface 307 of the child seat assembly 245 is a position that is generally flush with the rest of the patient platform 235 when the child restraint system 242 is stowed for adult use. The crossbar coupler 313 in the depicted example includes one or more crossbar pins 315 extending from the pad surface 307 that are received in corresponding pin notches 320 in the crossbar 250. The pin notches 320 have pin clips 322 for securing the crossbar pins 315 when the child seat assembly 245 is folded down against the crossbar 250. In the illustrated example, the child restraint backrest 302 of the child seat assembly 245 has two crossbar pins 315, but the child seat assembly 245 in other examples the pad surface 307 can have more or less. Moreover, it is envisioned that the other types of crossbar coupler 313 can be used to secure the child seat assembly 245 to the crossbar 250 in other ways.

The child seat assembly 245 is selectively attachable and selectively detachable from the crossbar 250 by unlatching crossbar coupler 313 from the pin clips 322. Once detached from the crossbar 250, the child seat assembly 245 can be moved in a direction indicated by double arrow 325 if FIG. 3 from the plane of the frame 230 and the crossbar 250, while remaining connected to the seat 210 via a hinge 330. The hinge 330 connects the child seat assembly 245 to the frame 230 in one example, and in another example, the hinge 330 connects the child seat assembly 245 to the seat 210 of the patient platform 235. In the illustrated example, the hinge 330 is a ball joint 332 (ball-and-socket joint). By being a ball joint, the child seat assembly 245 is able to be pivoted from the frame 230 and rotated about the hinge 330 such that the child restraint seat 305 is flipped over so that the child seat assembly 245 can be unfolded. In other examples, various compound hinges or other connectors can be used instead. For instance, the hinge 330 can include a living type hinge and/or a bearing.

Once more, the child restraint seat 305 of the child restraint system 242 has the clip loops 310 that secure the child restraint seat 305 to the seat 210 when the child restraint system 242 is deployed for securing a child to the stretcher 200. As shown in FIG. 3, the seat 210 has one or more seat clip openings 335 with seat clips 340 to which the clip loops 310 are clipped. Together, the clip loops 310 and seat clips 340 form a seat latch mechanism 345 that secures the child restraint seat 305 to the seat 210. Other types of latch or securing mechanisms can be used in other examples besides the illustrated seat latch mechanism 345. It should be recognized that the clip loops 310 are loop-shaped to form handles or other grasping areas that help moving and manipulating the child seat assembly 245. When the child seat assembly 245 is stowed such that the pad surface 307 faces the pad 270, the clip loops 310 on the child restraint seat 305 are stowed underneath the patient platform 235 so as to not interfere or otherwise impair the use of the stretcher 200 by an adult patient.

Figure 4:
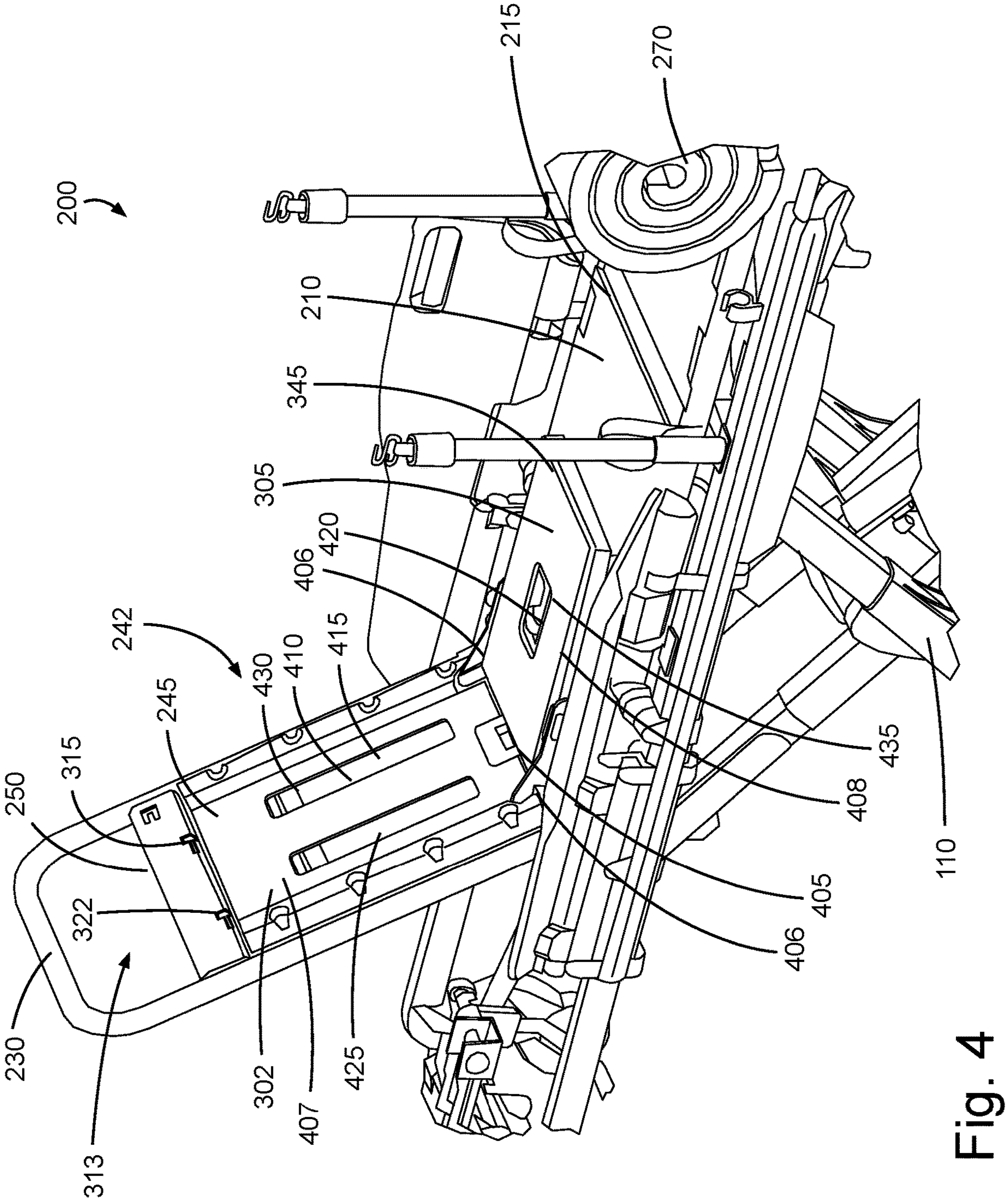
FIG. 4 is an enlarged perspective view of the child restraint seat being unfolded from the backrest via the backrest hinge.

FIG. 4 shows the child restraint system 242 when in a deployed state where the child can be buckled to the stretcher 200. As can be seen, the child restraint backrest 302 and child restraint seat 305 are unfolded apart from one another. The child restraint seat 305 rests against the seat 210 with the clip loops 310 clipped to the seat clips 340 (FIG. 3). The child restraint backrest 302 is resting against the crossbar 250 inside the frame 230. In particular, the crossbar pins 315 are clipped inside the pin clips 322. The child restraint backrest 302 and child restraint seat 305 of the child seat assembly 245 are coupled together with a backrest hinge 405. The backrest hinge 405 can further include one or more hinge arms 406 that guide the child restraint backrest 302 and child restraint seat 305 during folding and unfolding child seat assembly 245. The backrest hinge 405 allows the child restraint backrest 302 and child restraint seat 305 to fold together when stowed and unfold apart when deployed to form a seat for the child. The child restraint backrest 302 has a child back surface 407 against which the back of the child rests when in the child restraint system 242, and the child restraint seat 305 has a child seat surface 408 on which the child sits. The child can directly or indirectly rest against the child back surface 407 and child seat surface 408. For instance, a pad, such as the pad 270, may be used to provide extra cushion for the child against the child back surface 407 and child seat surface 408 when in the child restraint system 242. Typically, the child seat assembly 245 is made of a hard and/or rigid material so that the additional cushioning may enhance comfort and/or safety. When the child restraint backrest 302 and child restraint seat 305 are folded together via the backrest hinge 405, the child back surface 407 and child seat surface 408 face and contact (or nearly contact) one another.

The child seat assembly 245 of the child restraint system 242 includes a child harness 410 configured to secured and/or restrain the child. The child harness 410 includes one or more child belts 415 and buckles 420 for securing the child in the child harness 410. In one example, the child harness 410 is a three-point harness, and in other examples, the child harness 410 is a five-point harness. It should be recognized that the child belts 415 and buckles 420 of the child harness 410 can be configured differently to form other harness configurations. In one form, the child belts 415 are formed from webbing, and the child belts 415 can include shoulder and lap type straps or belts. The buckle 420 is configured to secure the child harness 410 in a releasable manner. The child harness 410 can be adjustable to accommodate children of various sizes.

To facilitate compact storage when the child restraint backrest 302 and child restraint seat 305 are folded together, the child back surface 407 of the child restraint backrest 302 has one or more belt grooves 425 configured to receive the child belts 415 so that the child belts 415 are flush with or located below the child back surface 407 when retracted. The child back surface 407 of the child restraint backrest 302 further defines belt openings 430 at one end of each of the belt grooves 425. The belt openings 430 extend through the child restraint backrest 302 and allow the child belts 415 to pass through to the opposite side of the child restraint backrest 302 for securing purposes. To further facilitate compact storage when the child restraint backrest 302 and child restraint seat 305 are folded together, the child seat surface 408 of the child restraint seat 305 defines a buckle cavity 435 configured to receive the buckles 420 so that the buckle 420 is able to be stored at or below the child seat surface 408.

Figure 5:
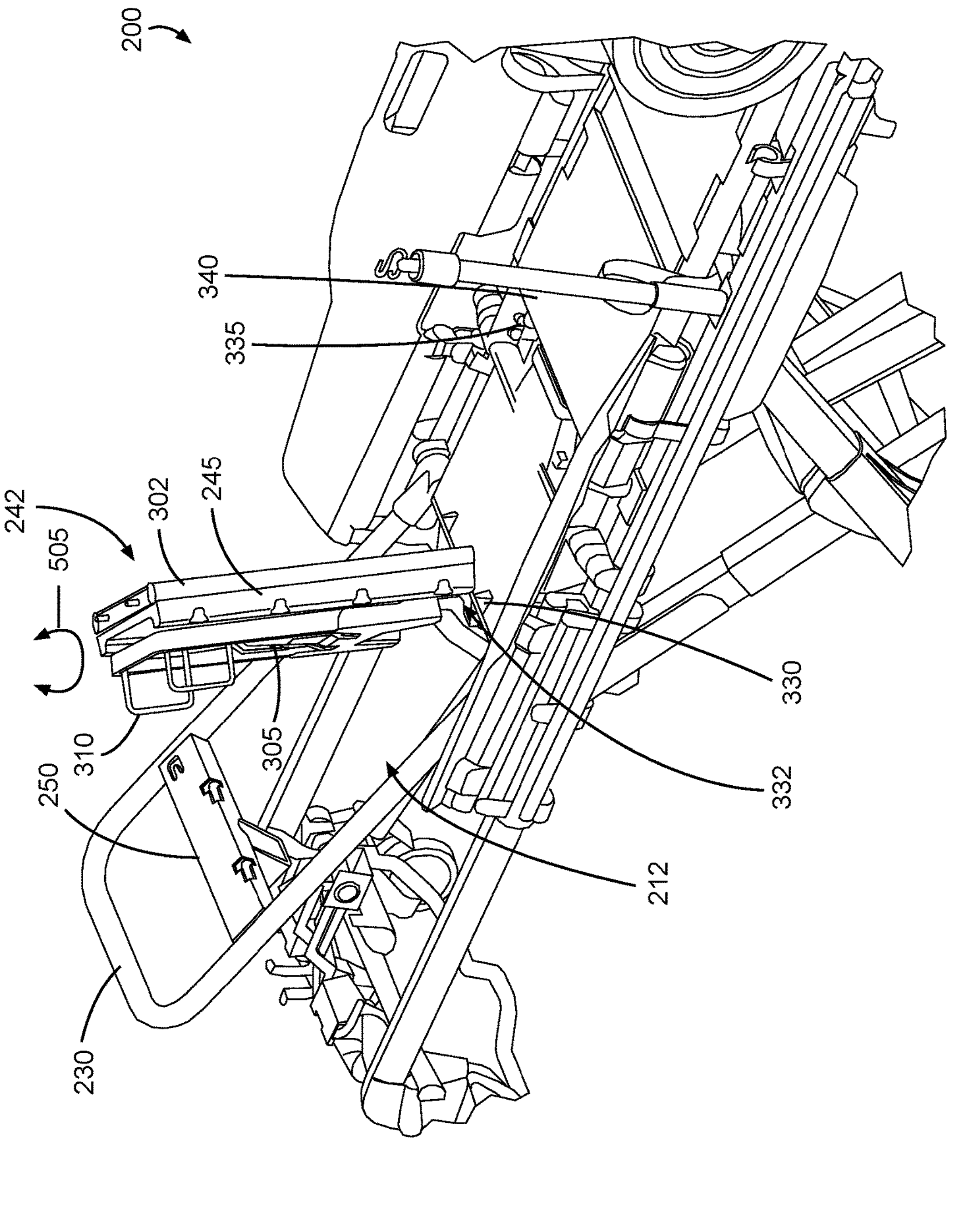
FIG. 5 is an enlarged perspective view of the backrest and the child restraint seat being rotated about the hinge.

As noted before, the hinge 330 is configured to allow the child seat assembly 245 to be folded out of the child restraint cavity 212 in the frame 230 and flipped during deployment and stowing of the child restraint system 242. FIG. 5 depicts the child seat assembly 245 being rotated about the hinge 330 in the directions indicated by rotational double arrow 505. This rotational or flipping motion occurs when the child seat assembly 245 transitions between the positional configurations shown in FIGS. 3 and 4. In one example, the child seat assembly 245 can be rotated both in a clockwise or a counterclockwise direction during deployment or stowing of the child restraint system 242. In other examples, the hinge 330 can have a limited range of motion and/or can rotate in only one direction when the child seat assembly 245 is flipped.

Figure 6:
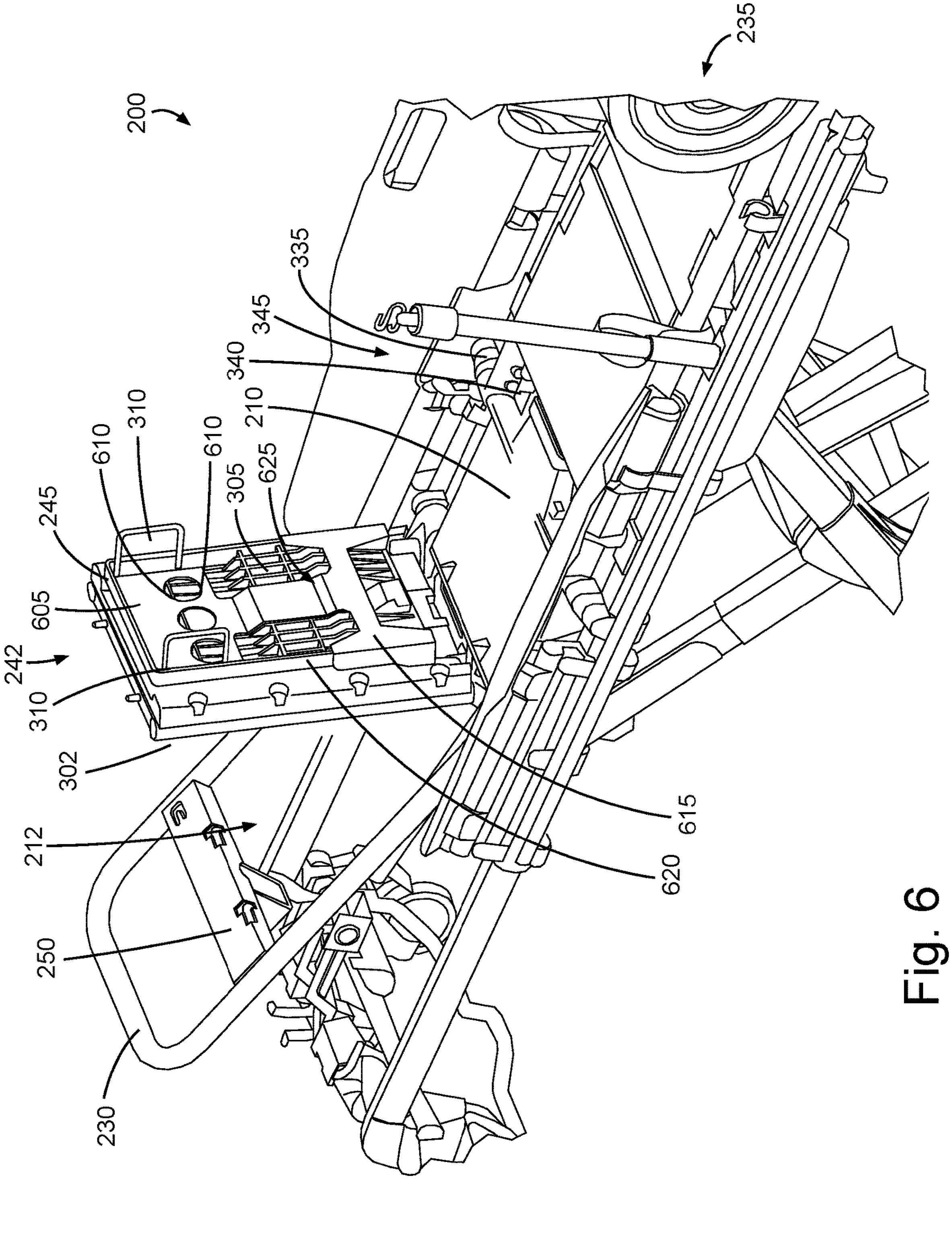
FIG. 6 is an enlarged perspective view of the backrest and the child restraint seat in position after being rotated about the hinge.

FIG. 6 shows the relative orientation of the child seat assembly 245 after the child seat assembly 245 is flipped or rotated during deployment. As can be seen, the child restraint seat 305 has an undercarriage side 605 that rests against the seat 210 when the child restraint system 242 is fully deployed and is positioned underneath the patient platform 235 when the child seat assembly 245 is stowed during adult use of the stretcher 200. The undercarriage side 605 has a belt guide system 610 that facilitates smooth movement and guiding of the child belts 415. The belt guide system 610 in the illustrated example includes a belt shield 615 and one or more guide ribs 620 that define guide cavities 625 through which the child belts 415 are routed. The belt guide system 610 reduces the chance of the child belts 415 being pinched between the seat 210 and child restraint seat 305 when the child restraint seat 305 rests against the seat 210 during deployment of the seat 210. Moreover, when the child seat assembly 245 is stowed away in the child restraint cavity 212 when the child restraint system 242 is not in use, the belt guide system 610 reduces the chance of the child belts 415 being tangled or otherwise interfering with the operation of other components of the stretcher 200.

Figure 7:
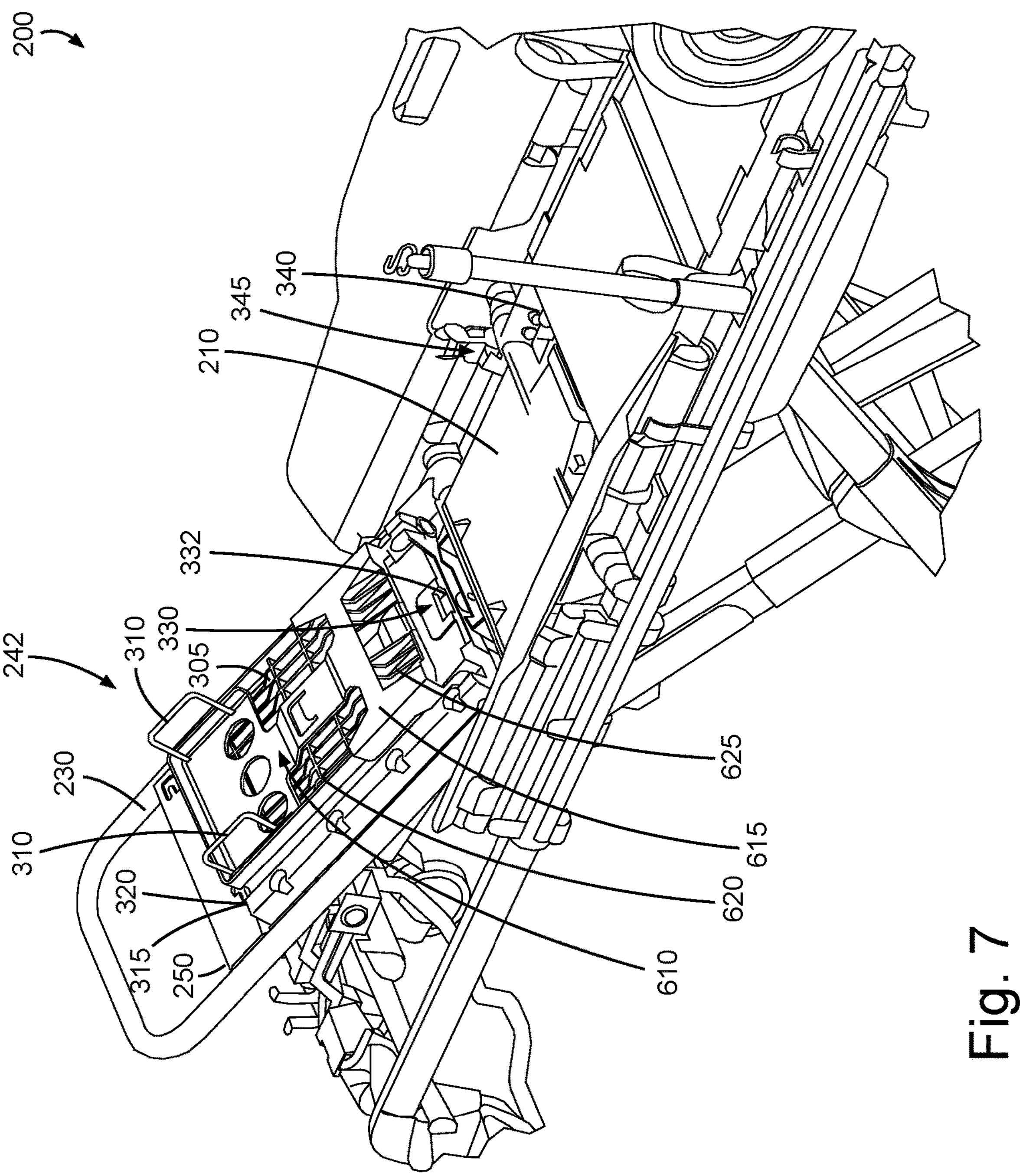
FIG. 7 is an enlarged perspective view of the reversed backrest and child restraint seat inserted back into the plane of the frame and the crossbar.

After being flipped in the manner as depicted in FIG. 6 during deployment of the child restraint system 242, the child seat assembly 245 can be folded back into the child restraint cavity 212 such that the child seat assembly 245 rests against the crossbar 250. As shown in FIG. 7, the child seat assembly 245 is returned to the same plane as the frame 230 and the crossbar 250 in the now reversed position by moving the child seat assembly 245 in the direction indicated by the double arrow 325 (FIG. 3) via the hinge 330. From that position, the child restraint seat 305 via the backrest hinge 405 can be folded down against the seat 210 to the position depicted in FIG. 4. The child restraint seat 305 can be held in place by the clip loops 310 being clipped to the seat clips 340 of the seat latch mechanism 345.

Figure 8:
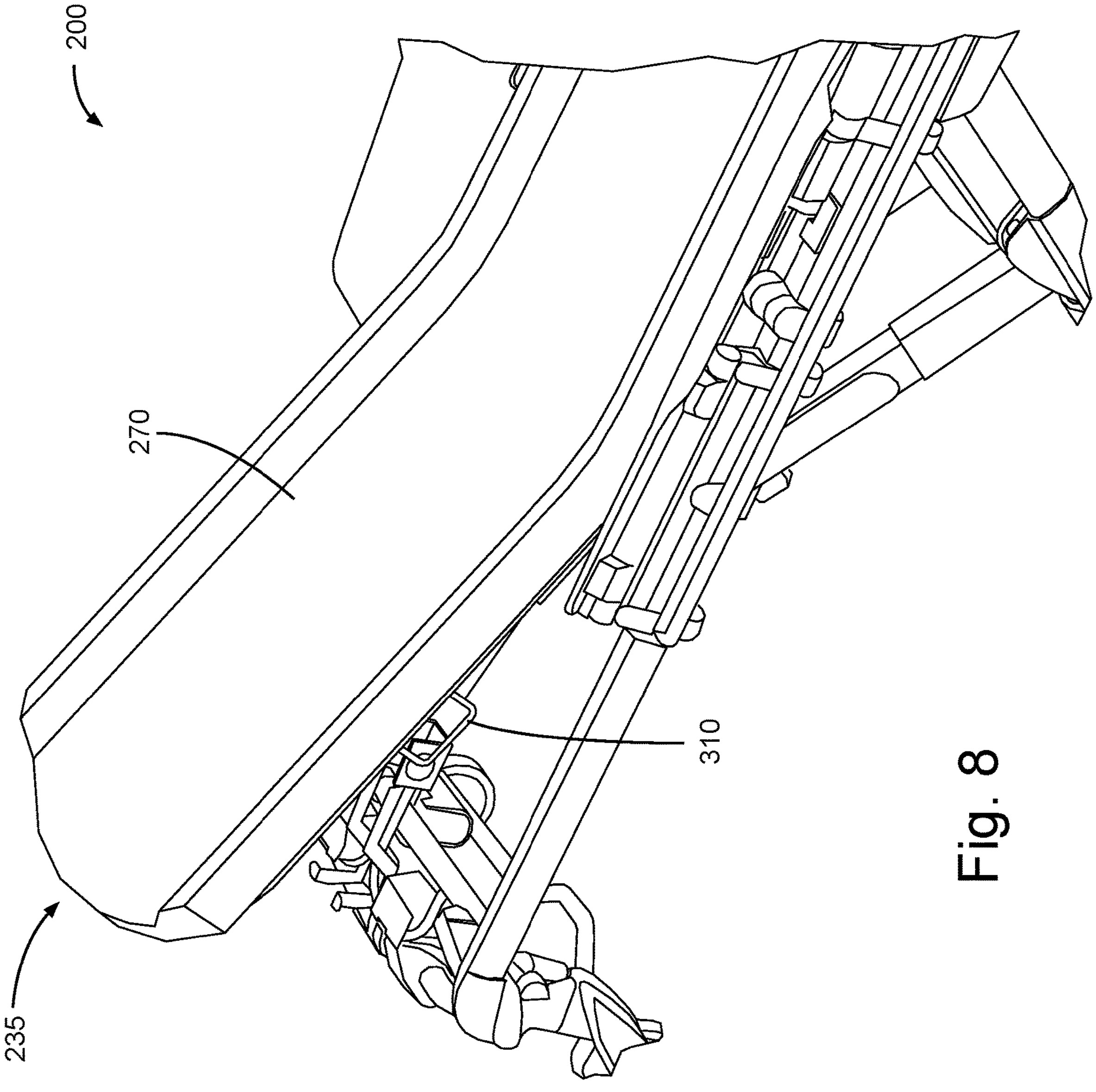
FIG. 8 is an enlarged perspective view of the stretcher configured to transport an adult.

When the stretcher 200 needs to be used by an adult, the child restraint system 242 can be stowed in the manner as depicted in FIG. 2. The pad 270 can be unrolled, unfolded, or otherwise moved to recover the patient platform 235 in the manner as depicted in FIG. 8. Once the pad 270 covers the patient platform 235, the adult is able to be placed in a general comfortable supine position on the stretcher 200. The adult restraint assembly 140 can then be used to secure the adult-sized patient during transport without the child restraint system 242 interfering. As should be recognized, the child restraint system 242 can be quickly deployed and stowed on an as-needed basis.

The stretcher 200 can be used to safely, securely, and conveniently transport both children and adults. With the child restraint system 242 being integrated with the stretcher 200, the child restraint system 242 is readily available to use in most circumstances. Moreover, the child restraint system 242 is compactly stored in the stretcher 200 such that there is no or very little interference with the operation of the rest of the stretcher 200. Having the child restraint system 242 forming a structural component of the stretcher 200, very little additional weight is added to the stretcher 200. In the illustrated example, the child seat assembly 245 structurally forms the backrest 205 such that very little extra weight is added to the stretcher 200.

One technique of many for deploying and stowing the child restraint system 242 will now be described with reference to the previously discussed drawings. Again, FIG. 8 shows the configuration of the stretcher 200 when generally used for adults. As shown, the pad 270 covers the child restraint system 242 along with the rest of the patient platform 235. To access and deploy the child restraint system 242, the medical technician or other professional, such as an emergency responder, removes the pad 270 from the patient platform 235 such as by rolling the pad 270 in the manner as depicted in FIG. 2. With the child restraint system 242 exposed, the technician is then able to unclip of the crossbar pins 315 from the pin clips 322 and lift the child seat assembly 245 in the manner as depicted in FIG. 3. Once more, the child seat assembly 245 is pivoted on the hinge 330 towards the seat 210. The child seat assembly 245 is then able to be rotated or flipped in the manner as depicted in FIG. 5 via the hinge 330 (e.g., the ball joint 332).

Once the child seat assembly 245 is at the orientation depicted in FIG. 6, the technician can lower the child seat assembly 245 back into the child restraint cavity 212 of the frame 230. When lowered, the crossbar pins 315 are clipped back into the pin notches 320 of the crossbar 250, as is depicted in FIG. 7. The technician can then grab the clip loops 310 to unfold the child restraint seat 305 from the child restraint backrest 302. The clip loops 310 of the seat latch mechanism 345 are clipped into the seat clips 340 to secure the child restraint seat 305. Looking at FIG. 4, the child belts 415 can be loosened and pulled out of the belt grooves 425, and the buckles 420 can be pulled out of the buckle cavity 435. The frame 230 can be raised to a seated position. The child is then placed in the seated position on the child seat assembly 245, and the child can be fitted into the child harness 410 and the buckle 420 can be fastened. The child belts 415 can be snuggly fitted to child to properly secure the child to the stretcher 200.

The child restraint system 242 ensures that the child can be safely transported on the stretcher 200. Via the transport system 115 (FIG. 1), the stretcher 200 can be rolled to the medical vehicle, such as an ambulance, and once there, the stretcher 200 with the child can be load into the vehicle. When inside the vehicle, the stretcher 200 can be firmly secured to the vehicle through the cot retainer 175 secured to the safety hooks of the vehicle. With the stretcher 200 secured to the vehicle via the cot retainer 175, and the child safely secured to the stretcher 200 via the child restraint system 242, there is a lower risk of injury to the child even in the unexpected chance that a vehicular accident occurs.

Once the child arrives at the designated medical facility, the stretcher 200 along with the child can be unloaded from the vehicle, and the stretcher 200 can be moved into the facility. The child harness 410 can be loosed and the buckle 420 unsecured so that the child can be removed from the stretcher 200 for further treatment at the facility. The stretcher 200 can then be quickly reconfigured for adult use by generally using the reverse process to stow the child restraint system 242 in the stretcher 200.

Other examples of child restraint systems that are integrated into stretchers have been developed. Some of these various examples or embodiments will be described below. These stretcher designs include a number of functions and components similar to the embodiments described with reference to FIGS. 1 and 2. For the sake of clarity and brevity, these common features will not be again discussed in great detail below, so please refer to the previous discussions of these features.

Figure 9:
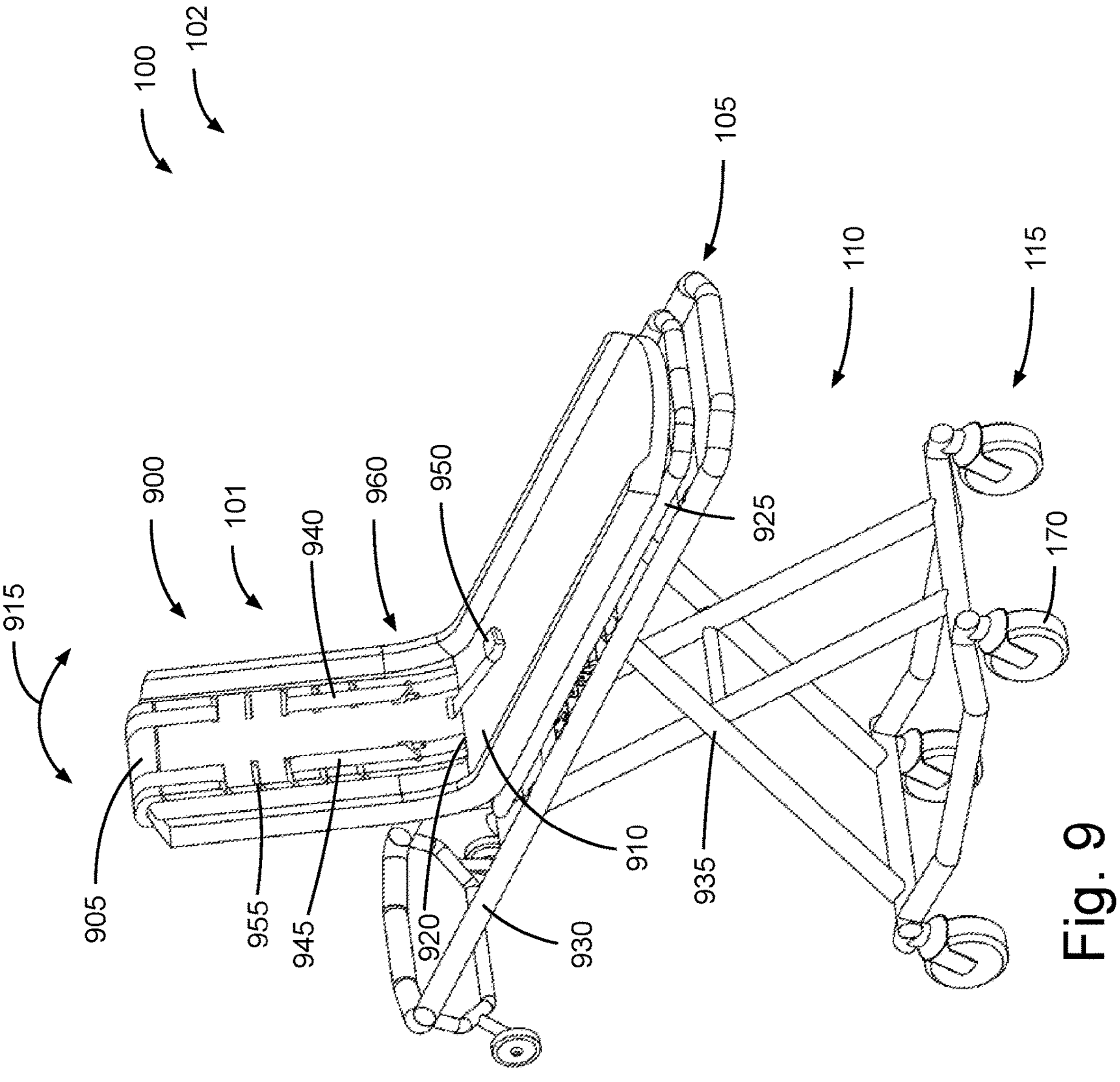
FIG. 9 is a perspective view of one embodiment of a stretcher.

FIG. 9 illustrates another embodiment of a stretcher 900. As shown, the child restraint system 101 in FIG. 9 includes a child restraint pad 905. The child restraint pad 905 is able to flip over the torso portion of a pad 910 in the direction shown by double arrow 915. The stretcher 900 includes a snap hook 920, which secures the child restraint pad 905 to a frame 925. The frame 925 is supported by a patient platform 930, which is supported in a vertical direction by a lift system 935. While a fixed leg frame is depicted, it should be recognized that other types of lift systems 935, such as a variable height frame or a battery-powered hydraulic frame, can be implemented. The child restraint pad 905 further includes a first strap 940, a second strap 945, a buckle 950, and indexing slots 955 that form a child harness 960. While a three-point harness is depicted, it should be recognized that the child harness 960 can include other types of harness systems.

This embodiment allows the user to quickly covert the stretcher 900 to the child restraint system 101. The child restraint pad 905 is flipped over and fastened by attaching the snap hook 920 to the frame 925. A child can then be placed on the pad 910, with the back of the child placed against the child restraint pad 905 and the buckle 950 situated between the legs of the child. The first strap 940 and the second strap 945 then can be coupled to the buckle 950 to secure the child to the stretcher 900. Notably, the webbing of the first strap 940 and the second strap 945 can be adjusted by weaving the first strap 940 and the second strap 945 through different indexing slots 955. This allows the user to adjust the harness to properly secure the child, depending on the size of the child. Once the child is secure, the child and the stretcher 900 are ready for transport.

Figure 10:
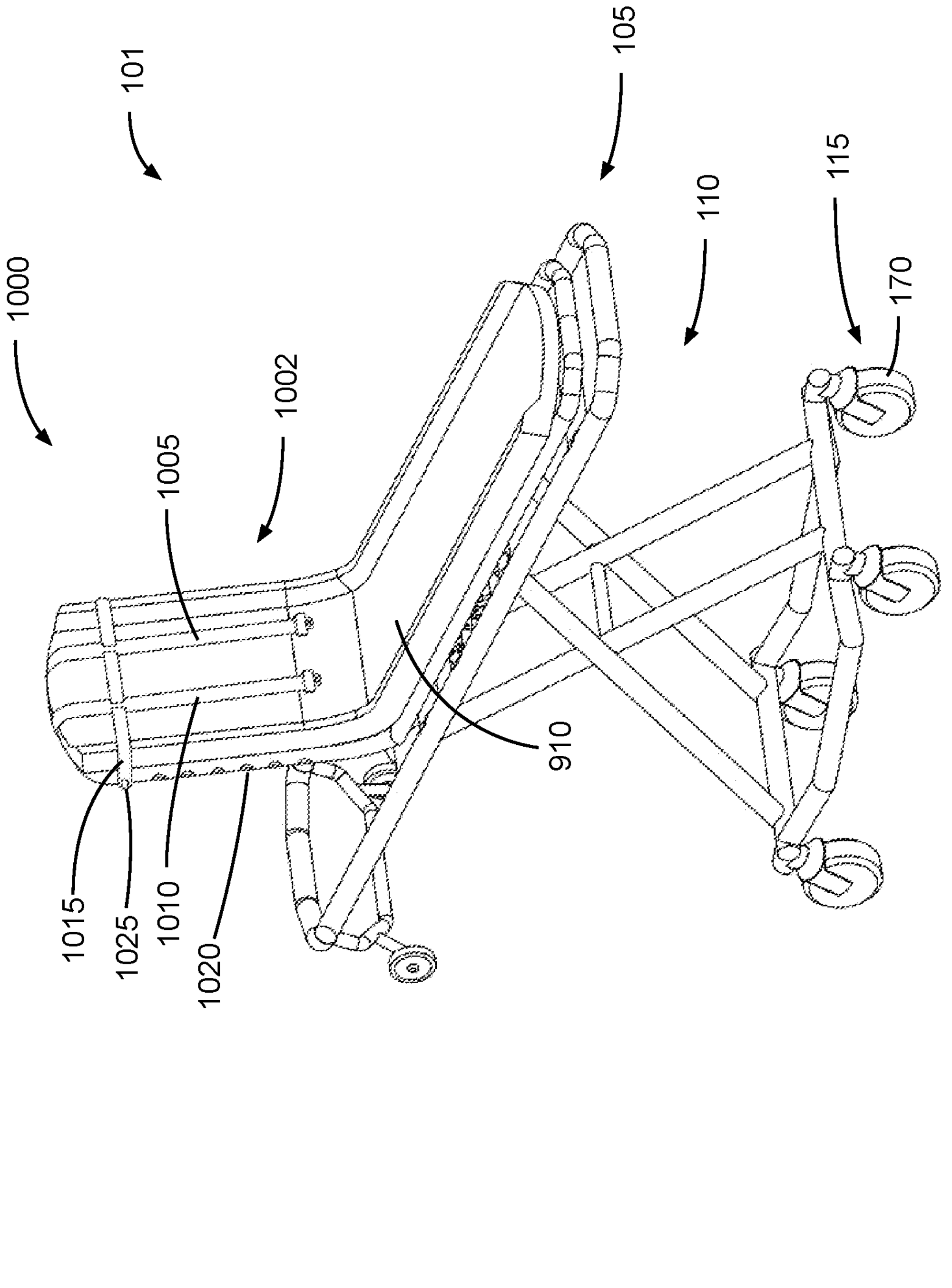
FIG. 10 is a perspective view of yet another embodiment of a stretcher.

FIG. 10 illustrates a stretcher 1000 that includes the pad 910. The stretcher 900 has the adult restraint assembly 140 in the form of an adult harness 1002. The adult harness 1002 includes a first strap 1005 and a second strap 1010. The child restraint system 101 in this example includes an indexing bar 1015 that is able to convert the adult harness 1002 to a child-sized harness. The stretcher 1000 includes indexing slots 1020 for adjusting the height of the indexing bar 1015. The indexing bar 1015 has fasteners 1025 that are secured in the indexing slots 1020 to adjust harness height. The child is placed on the pad 910 and secured to the stretcher 1000 by the first strap 1005 and the second strap 1010. The indexing bar 1015 is adjusted to the proper height for the size of the child by moving the indexing bar 1015 to the appropriate indexing slots 1020 to ensure the child is safely secured.

Figure 11:
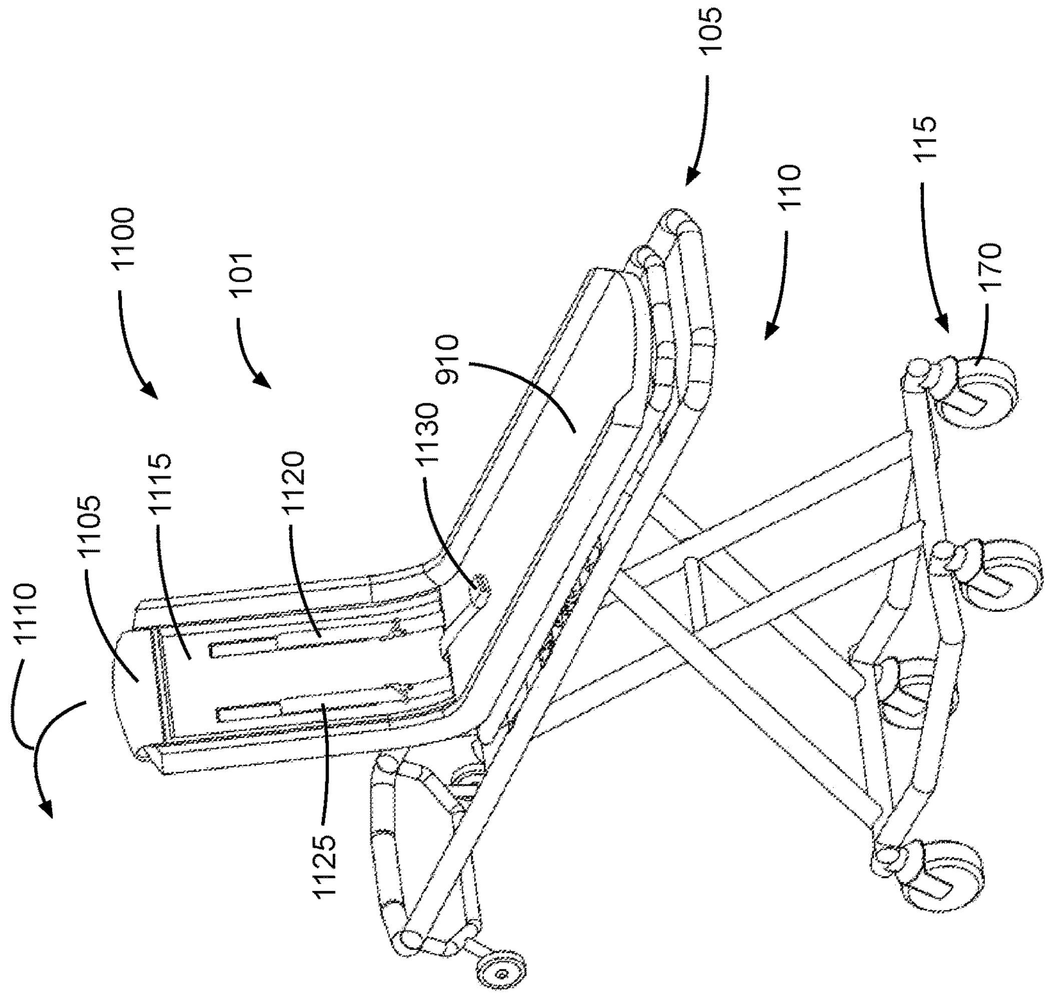
FIG. 11 is a perspective view of another embodiment of a stretcher.

FIG. 11 illustrates a stretcher 1100 with a pad 910 that has a pad cover 1105 that is removable in the direction indicated by an arrow 1110. Beneath the pad cover 1105 is a child restraint system 1115, which includes a first strap 1120, a second strap 1125, and a buckle 1130. A user of this embodiment removes the pad cover 1105 and flips the pad cover 1105 over the torso portion of the pad 910. From there, a child patient is placed onto the pad 910 with the back of the child positioned against the child restraint system 1115. The first strap 1120 and second strap 1125 are then coupled to the buckle 1130 to securely fasten the child to the stretcher 1100. Additionally, the first strap 1120 and second strap 1125 are adjustable and lockable to the appropriate height for the size of the child.

Figure 12:
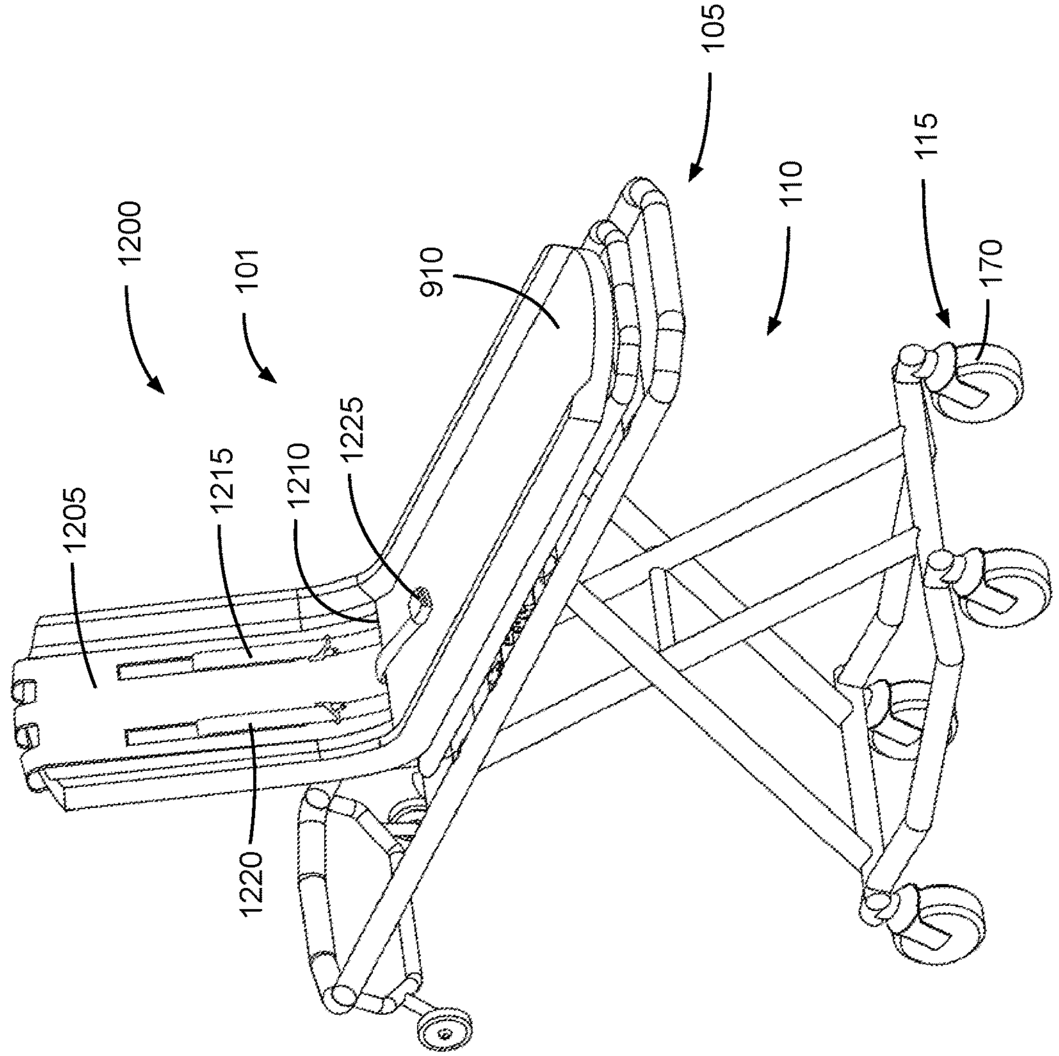
FIG. 12 is a perspective view of one embodiment of a stretcher.

FIG. 12 depicts an embodiment of a stretcher 1200 that includes a child restraint attachment 1205, which is a separate assembly that is coupled to the pad 910 and has a snap hook 1210. The child restraint attachment 1205 further includes a first strap 1215 and a second strap 1220 that are adjustable and lockable at various heights, which can be coupled to a buckle 1225. A user of the stretcher 1200 places the child restraint attachment 1205 onto the pad 910 by attaching a hook section of the child restraint attachment 1205 onto the headrest 145 area of the pad 910 and fastening the child restraint attachment 1205 to the frame. The user further couples the child restraint attachment 1205 to the pad 910 via the snap hook 1210. Once the child restraint attachment 1205 is securely attached, a child is placed on the pad 910 with their back resting against the child restraint attachment 1205 and the buckle 1225 positioned between the legs of the child. The first strap 1215 and second strap 1220 are then coupled to the buckle 1225 to restrain the child. The first strap 1215 and second strap 1220 are then adjusted to securely fasten the child, depending on the child's height and weight.

Figure 13:
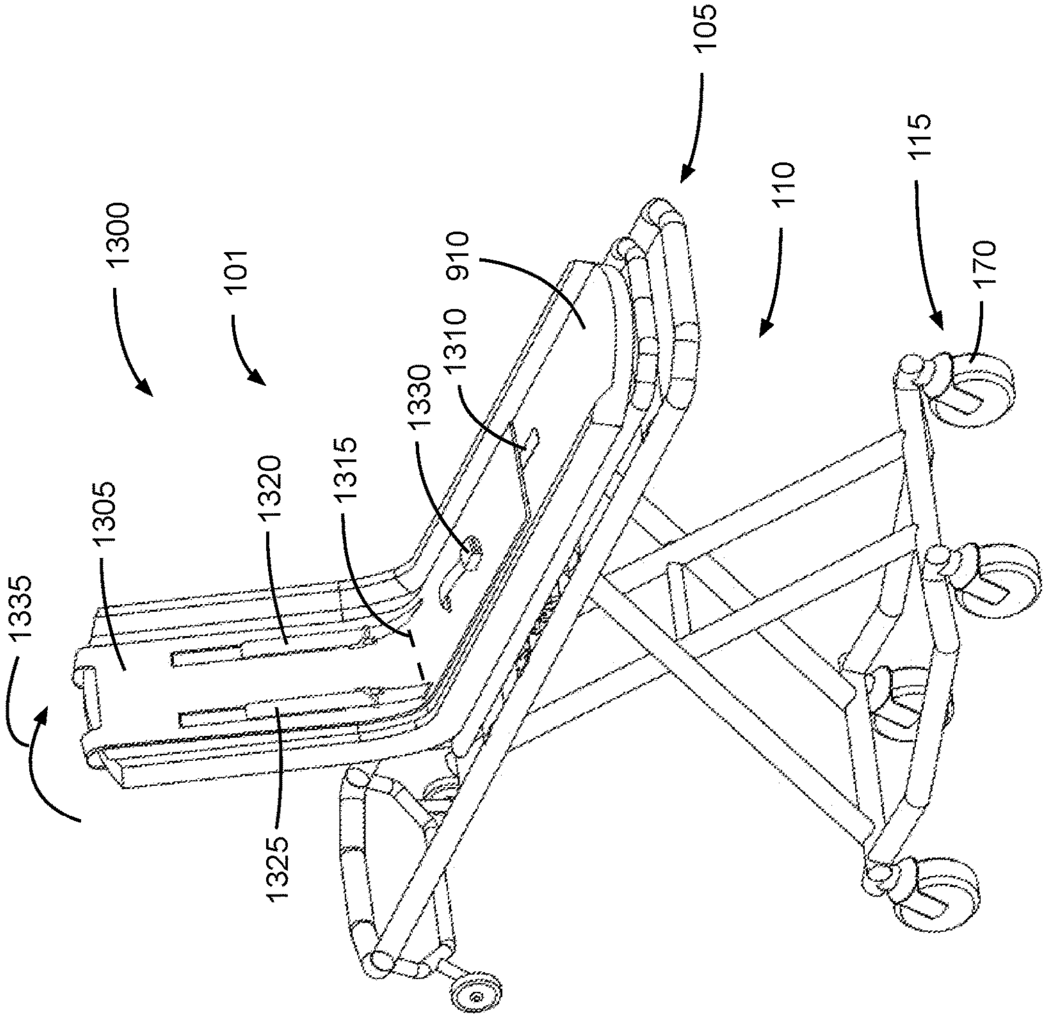
FIG. 13 is a perspective view of another embodiment of the stretcher depicted in FIG. 1.

FIG. 13 depicts another embodiment of a stretcher 1300. The stretcher 1300 includes a child restraint attachment 1305 that flips over the torso section of the pad 910. The child restraint attachment 1305 includes a fastening strap 1310 to unfold the child restraint attachment 1305 and a snap hook 1315 to secure the child restraint attachment 1305. The child restraint attachment 1305 also has a first strap 1320, a second strap 1325, and a buckle 1330 for restraining a child. A user of the stretcher 1300 flips the child restraint attachment 1305 over the torso section of the pad 910 as indicated by arrow 1335. Once the child restraint attachment 1305 is flipped over, the fastening strap 1310 is unfastened and the child restraint attachment 1305 is unfolded. The child restraint attachment 1305 can then be secured to the pad 910 via the snap hook 1315. A child is then placed on the child restraint attachment 1305 with the buckle 1330 positioned in between the legs of the child and the back of the child positioned on the child restraint attachment 1305. The first strap 1320 and the second strap 1325 can then be coupled to the buckle 1330 to restrain the child. The first strap 1320 and the second strap 1325 can be adjusted to appropriately secure the child.

Figure 14:
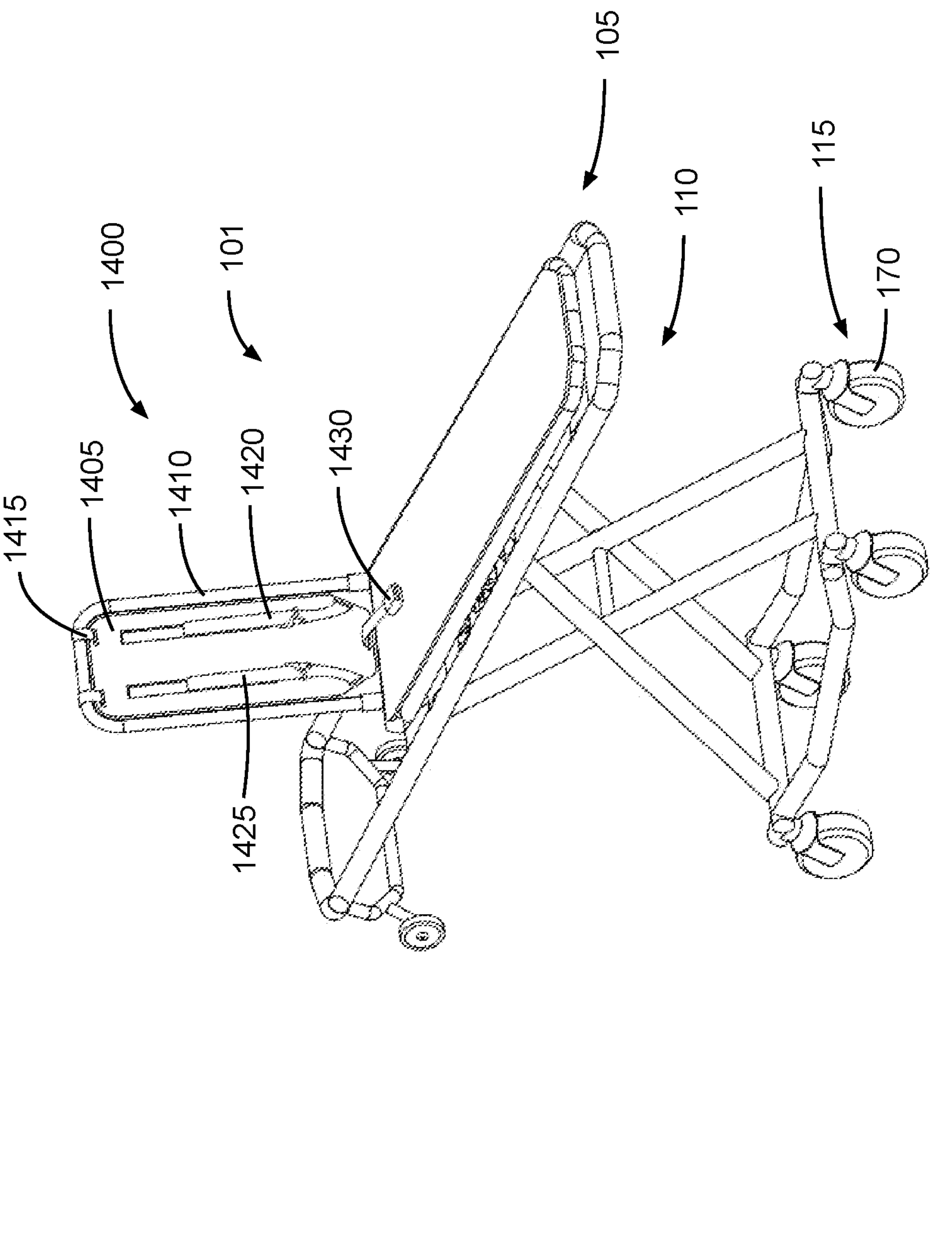
FIG. 14 is a perspective view of one embodiment of a stretcher.

FIG. 14 depicts a stretcher 1400 that includes a child restraint system 1405 attached to a patient support assembly 1410 via a patient support strap 1415. The stretcher 1400 further includes a first strap 1420, a second strap 1425, and a buckle 1430 built into the child restraint system 1405. A user of the stretcher 1400 removes the pad 270, which reveals the child restraint system 1405. Once the pad 270 is removed, the child is placed onto the stretcher 1400 with the buckle 1430 positioned between the legs of the child and the back of the child positioned against the child restraint system 1405. The user then secures the child to the child restraint system 1405 by coupling the first strap 1420 and second strap 1425 to the buckle 1430. The first strap 1420 and second strap 1425 are adjustable to fit the size of the child for safe transportation.

Figure 15:
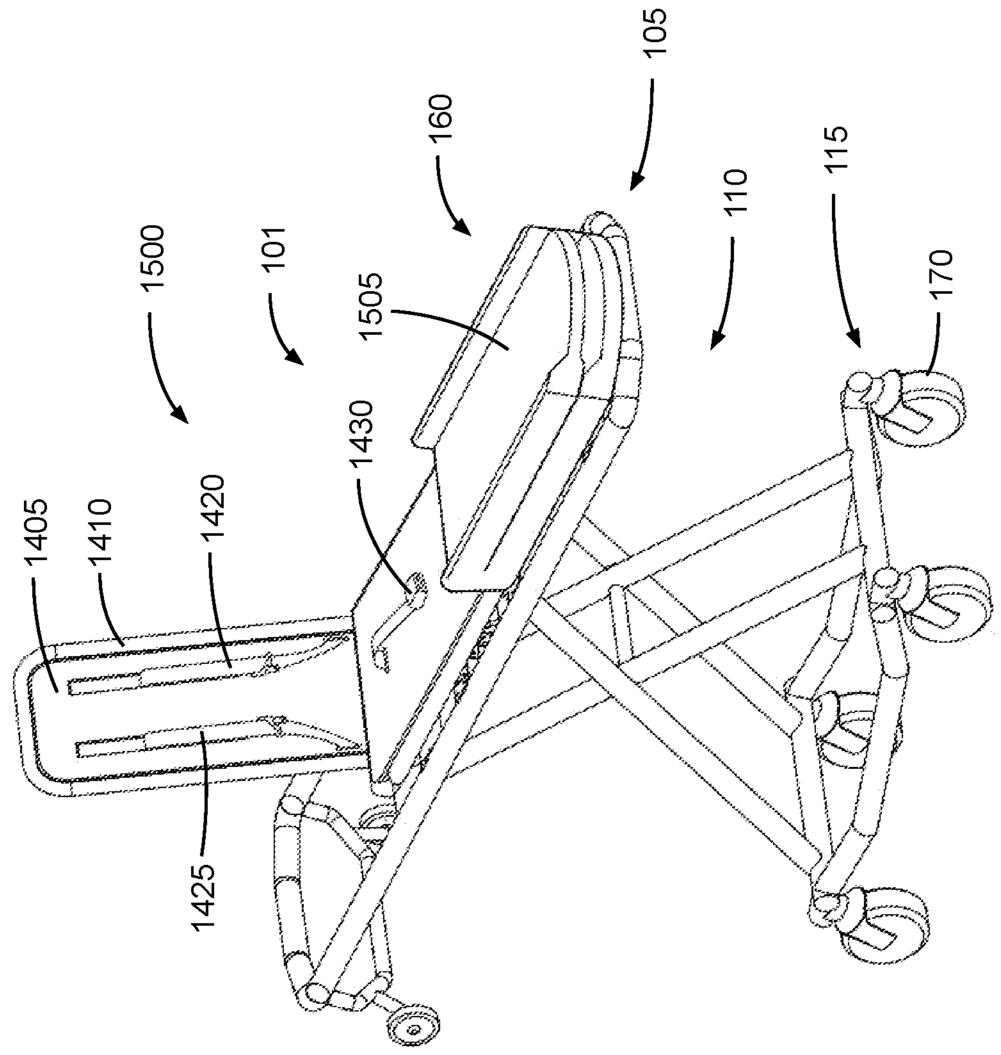
FIG. 15 is a perspective view of yet another embodiment of a stretcher.

FIG. 15 illustrates a stretcher 1500 that is similar to the embodiment shown in FIG. 14. However, this embodiment includes a pad 1505 that does not need to be removed completely. A user of the stretcher 1500 folds the pad 1505 to reveal the child restraint system 1405. In this embodiment, the pad 1505 is stored proximal the leg rest 160 of the stretcher 1500. Once the pad 1505 is folded, the user proceeds to use the stretcher 1500 in the same manner as the stretcher 1400 in FIG. 14.

Figure 16:
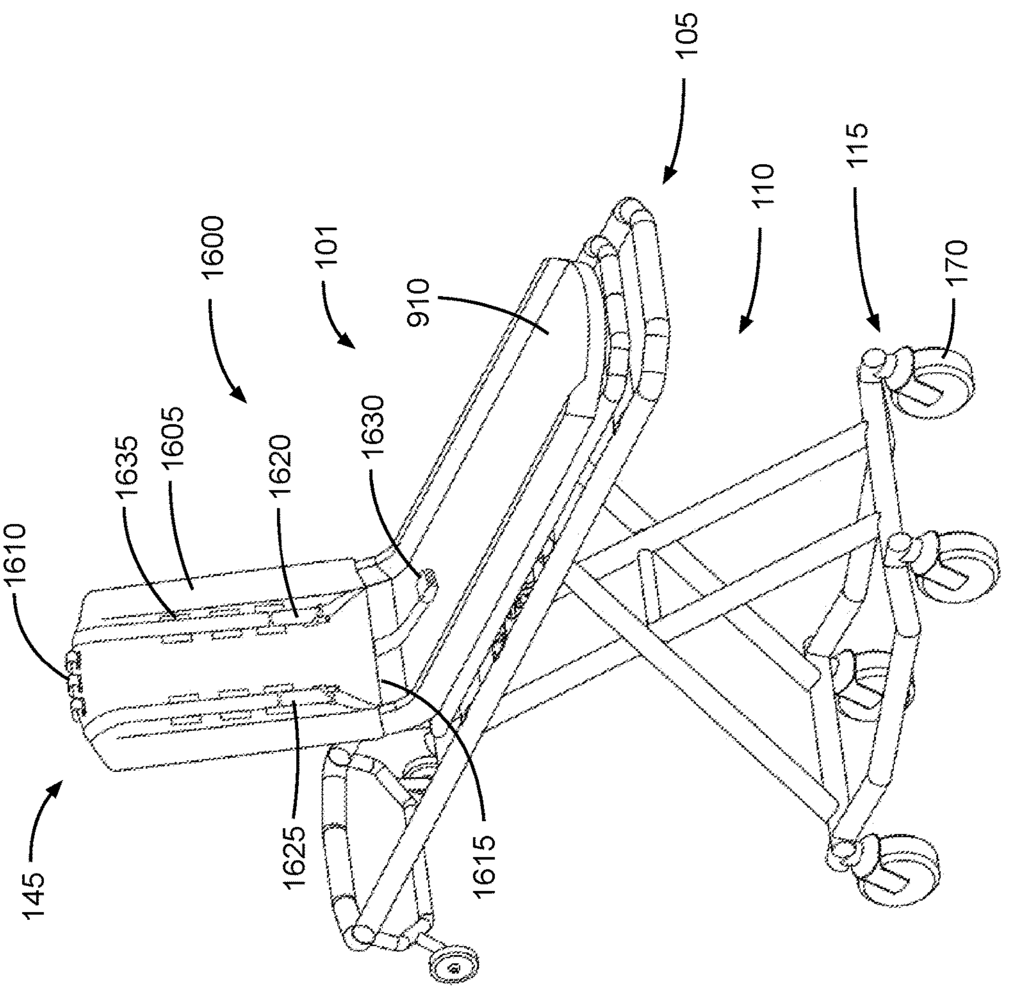
FIG. 16 is a perspective view of another embodiment of the FIG. 1 stretcher.

FIG. 16 depicts a stretcher 1600 that includes a child restraint cover 1605. The child restraint cover 1605 has a fastening strap 1610 that secures the child restraint cover 1605 to the headrest 145 area of the pad 910. The child restraint cover 1605 further includes a snap hook 1615 to secure the headrest 145 area of the child restraint cover 1605 to the pad 910. The child restraint cover 1605 also has a first strap 1620, a second strap 1625, a buckle 1630, and indexing slots 1635. The child restraint cover 1605 is stored in a rolled, sack-like position at the location of the fastening straps 1610.

To use the child restraint cover 1605, a user unrolls the child restraint cover 1605 to cover the torso portion of the pad 910. The child restraint cover 1605 is then securely fastened to the pad 910 via the snap hook 1615. A child is placed on the pad 910 with the buckle 1630 positioned between the child legs of the child and the back of the child positioned against the child restraint cover 1605. The child is then secured to the pad 910 by coupling the first strap 1620 and the second strap 1625 to the buckle 1630. The first strap 1620 and second strap 1625 can be adjusted to different heights via the indexing slots 1635, depending on the height of the child. The child is now secure and ready for transport.

Figure 17:
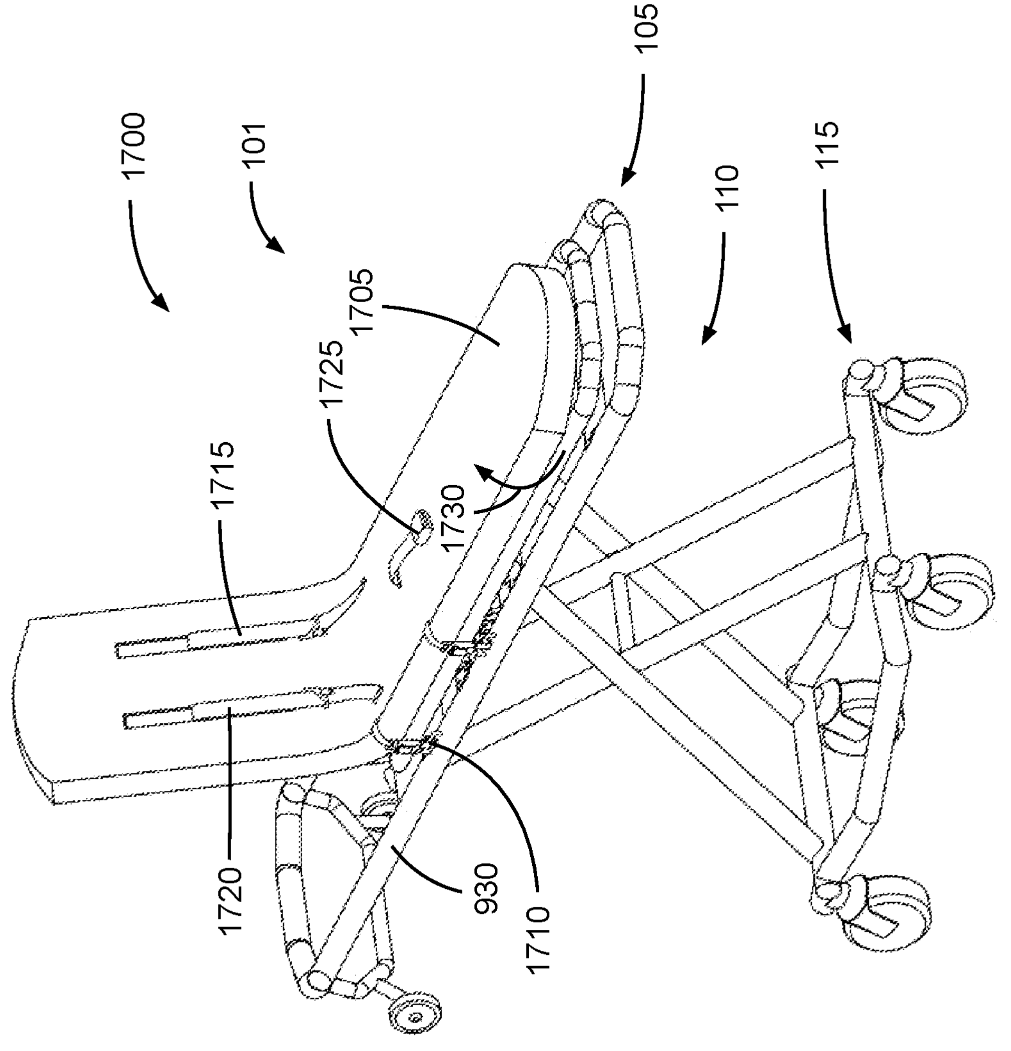
FIG. 17 is a perspective view of one embodiment of a stretcher.

FIG. 17 depicts an embodiment of a stretcher 1700, wherein a pad 1705 includes pad restraints 1710, a first strap 1715, a second strap 1720, and a buckle 1725. To reconfigure this embodiment from an adult-restraining stretcher to a child-restraining stretcher, the pad 1705 is unlatched from the patient platform 930 and flipped over in a direction exemplified by arrow 1730. Once flipped over, the pad 1705 is reattached to the patient platform 930 via the pad restraints 1710. The pad 1705 is now in its child-restraint configuration, where a child can be placed on the pad 1705 with the buckle 1725 positioned between the legs of the child and the back of the child positioned on the torso portion of the pad 1705. The child is then strapped into place by coupling the first strap 1715 and the second strap 1720 to the buckle 1725. The first strap 1715 and the second strap 1720 are adjustable to securely fasten the child to the pad 1705 for transport.

Figure 18:
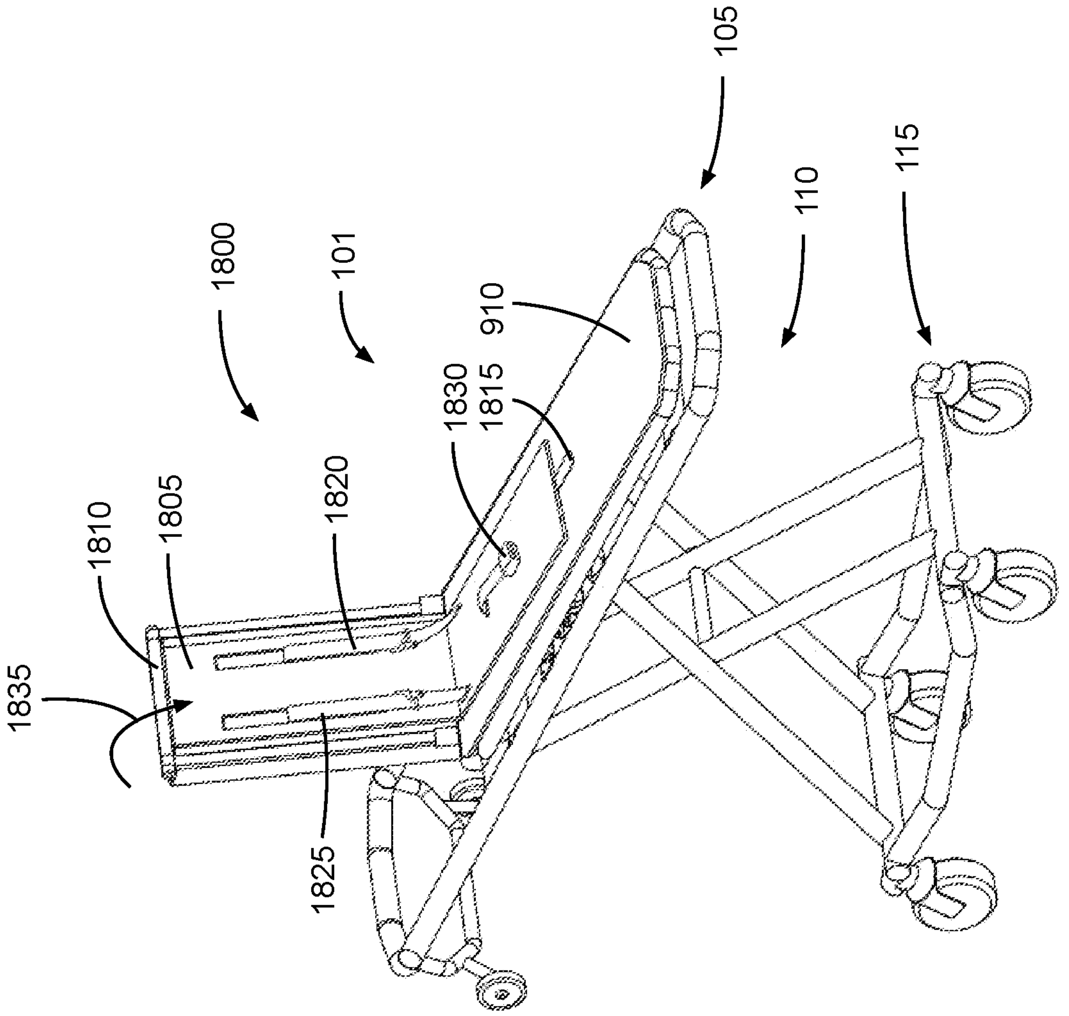
FIG. 18 is a perspective view of yet another embodiment of the stretcher depicted in FIG. 1.

FIG. 18 depicts a stretcher 1800 with a child restraint system 1805 that is housed within a frame-channel 1810. The child restraint system 1805 has a fastening strap 1815 that holds the child restraint system 1805 in a folded position. The child restraint system 1805 further includes a first strap 1820, a second strap 1825, and a buckle 1830.

To use this embodiment, a user pulls the child restraint system 1805 from the frame-channel 1810 behind the torso portion of the pad 910. The child restraint system 1805 is then flipped over the torso portion of the pad 910 as indicated by an arrow 1835. The child restraint system 1805 is then unfolded by unlatching the fastening strap 1815. A child can then be placed on the child restraint system 1805 with the buckle 1830 positioned in between the legs of the child and the back of the child positioned on the torso portion of the child restraint system 1805. The child is then secured to the stretcher 1800 by coupling the first strap 1820 and the second strap 1825 to the buckle 1830. The first strap 1820 and the second strap 1825 are adjustable to properly secure the child during transport.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Asymmetric" generally refers to an object not being identical on both sides of a central line.

"Ball Joint" or "Ball-and-Socket Joint" generally refers to a mechanical device that allows free rotation in two or more planes at the same time while substantially preventing translation motion in any direction. The ball joint for example includes a spherical knob or knoblike part that fits into a cavity or socket of another part. In one version, the ball joint includes a bearing stud and socket attached in a casing.

"Couple" or "Coupled" generally refers to an indirect and/or direct connection between the identified elements, components, and/or objects. Often the manner of the coupling will be related specifically to the manner in which the two coupled elements interact.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Flat" generally refers to a smooth and even surface without marked lumps and/or indentations.

"Frame" generally refers to a structure that forms part of an object and gives strength and/or shape to the object.

"Gurney" or "Trolley" generally refers to a rolling or wheeled type stretcher. Gurneys typically include a transport system that allows the gurney to be easily rolled across a surface such as on a floor or the street. Typically, but not always, the transport system in the gurney includes casters and/or wheels that roll across the surface. The transport system in other variations can include other devices for moving the gurney horizontally across a surface such as ball rollers, track types systems, pneumatic levitation type systems, or even magnetic levitation type systems. The gurney further commonly includes a patient platform on which a person is placed. In some cases, a lift system is disposed between the patient platform and the transport system for raising, lowering, and generally supporting the patient platform. For example, gurneys are usually (but not always) equipped with variable height frames, lifting mechanisms, wheels, tracks, and/or skids. Gurneys are commonly used in acute out-of-hospital care situations by Emergency Medical Services (EMS) in ambulances as well as by the military, and search and rescue personnel.

"Hinge" generally refers to a mechanical bearing or other device that connects at least two solid objects so as to allow only an angle of rotation between the objects. In one example, the objects connected by the hinge can rotate relative to each other about a fixed axis of rotation such that all other relative translations and/or rotations being are prevented to provide one degree of freedom. In other examples, the hinge can provide multiple degrees of freedom. For instance, a living hinge, which is made of flexible material like plastic, can provide multiple axes of rotational freedom. In one form, the hinge includes a leaf with a knuckle that receives a pin. Some examples of hinge types include spring hinges, barrel hinges, pivot hinges, butt-mortise hinges, case hinges, piano hinges, concealed hinges, butterfly hinges, flag hinges, strap hinges, H-hinges, counter-flap hinges, self-closing hinges, friction hinges, double action hinges, and crank hinges, to name just a few "Lateral" generally refers to being situated on, directed toward, or coming from the side.

"Lift Mechanism", "Lifting Mechanism", or "Lift System" generally refers to any mechanical device designed to raise and/or lower objects in a generally vertical direction. By way of non-limiting examples, the lift mechanism can include rotating joints, elevators, screw drives, and/or linkage type devices. The lift mechanism can be designed to discretely lift objects, such as in a case of an elevator, or lift objects in a continuous manner, such as chain and bucket type elevators and/or screw type conveyors. The lift mechanism can be manually and/or automatically powered. For instance, the lift mechanism can be powered by electricity, pneumatics, and/or hydraulics.

"Longitudinal" generally relates to length or lengthwise dimension of an object, rather than across.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, a pneumatic piston, a hydraulic piston, and/or an internal combustion engine.

"Seat Belt", "Safety Belt", "Vehicle Belt", or "Belt" generally refers to an arrangement of webs and other materials designed to restrain or otherwise hold a person or other object steady such as in a boat, vehicle, aircraft, and/or spacecraft. For example, the seat belt is designed to secure an occupant of a vehicle against harmful movement that may result during a collision or a sudden stop. By way of non-limiting examples, the seat belt can include webbing, buckles, latch plates, and/or length-adjustment mechanisms, such as a retractor, installed in the vehicle that is used to restrain an occupant or a child restraint system. The seat belt for instance can include a lap belt only, a combination lap-shoulder belt, a separate lap belt, a separate shoulder belt, and/or a knee bolster.

"Snap-Fit Connector" or "Snap-Fit Connection" generally refers to a type of attachment device including at least two parts, with at least one of which being flexible, that are interlocked with one another by pushing the parts together. The term "Snap-Fit Connector" may refer to just one of the parts, such as either the protruding or mating part, or both of the parts when joined together. Typically, but not always, the snap-fit connector includes a protrusion of one part, such as a hook, stud and/or bead, that is deflected briefly during the joining operation and catches in a depression and/or undercut in the mating part. After the parts are joined, the flexible snap-fit parts return to a stress-free condition. The resulting joint may be separable or inseparable depending on the shape of the undercut. The force required to separate the components can vary depending on the design. By way of non-limiting examples, the flexible parts are made of a flexible material such as plastic, metal, and/or carbon fiber composite materials. The snap-fit connectors can include cantilever, torsional and/or annular type snap-fit connectors. In the annular snap-fit type connector, the connector utilizes a hoop-strain type part to hold the other part in place. In one form, the hoop-strain part is made of an elastic material and has an expandable circumference. In one example, the elastic hoop-strain part is pushed onto a more rigid part so as to secure the two together. Cantilever snap-fit type connectors can form permanent type connections or can be temporary such that the parts can be connected and disconnected multiple times. A multiple use type snap-fit connector typically, but not always, has a lever or pin that is pushed in order to release the snap-fit connection. For a torsional snap fit connector, protruding edges of one part are pushed away from the target insertion area, and the other part then slides in between the protruding edges until a desired distance is reached. Once the desired distance is reached, the edges are then released such that the part is held in place.

"Stretcher" generally refers to an apparatus used for moving patients or others who require medical care. Some non-limiting types include carried and rolling types of stretchers. Stretchers that are typically carried by one or more individuals are commonly called a "cot" or "litter". For instance, these carried type stretchers include a framework of two or more poles with a long piece of canvas or other material slung between the poles that is used for carrying those who are sick, injured, or dead. Rolling or wheeled type stretchers, which are easily rolled or otherwise moved horizontally across a surface, are commonly called "gurneys" or "trolleys". Typically, but not always, the stretcher is intended to support the entire body of a traumatized, ambulatory, or non-ambulatory human patient, including infants, children, youths, and adults. The stretcher is normally (but not always) designed to support patients in a supine (e.g., horizontal), sitting (e.g., vertical), or in between position. If needed, the stretcher can also transport medical equipment along with the patient in a medical or transport vehicle. The stretcher is not intended for extended stay use such as for example used as a hospital bed.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Tilt-Lock Adjuster" generally refers to a webbing or strap adjustment mechanism that releases the mechanism's hold on the webbing for the purpose of releasing tension and/or lengthening the webbing when the mechanism is lifted and/or held at an angle that is generally transverse to the general longitudinal direction of the webbing. Typically, but not always, the tilt-lock adjuster does not inhibit the overall length of the webbing from being shortened when the free end of the webbing is pulled.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Web" or "Webbing" generally refers to a strap made of a network of thread, strings, cords, wires, and/or other materials designed to restrain or otherwise hold a person or other object steady such as in a boat, vehicle, aircraft, and/or spacecraft. By way of non-limiting examples, the web can be incorporated into a seat belt, a child booster seat, and/or a car seat.

The term "or" is inclusive, meaning "and/or".

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation, unless expressly discussed otherwise.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | stretcher |
| 101 | child restraint system |
| 102 | gurney |
| 105 | patient platform |
| 110 | lift system |
| 115 | transport system |
| 120 | frame |
| 125 | patient support assembly |
| 130 | pad |
| 135 | side rails |
| 140 | adult restraint assembly |
| 145 | headrest |
| 150 | backrest |
| 155 | seat |
| 160 | leg rest |
| 170 | wheels |
| 175 | cot retainer |
| 200 | stretcher |
| 205 | backrest |
| 210 | seat |
| 212 | child restraint cavity |
| 215 | leg rest |
| 220 | footrest |
| 225 | footrest bar |
| 230 | frame |
| 235 | patient platform |

-continued

| Reference Numbers | |
|---|---|
| 240 | frame hinge |
| 242 | child restraint system |
| 245 | child seat assembly |
| 250 | crossbar |
| 255 | intravenous pole |
| 260 | side rails |
| 265 | handle loops |
| 270 | pad |
| 302 | child restraint backrest |
| 305 | child restraint seat |
| 307 | pad surface |
| 310 | clip loops |
| 313 | crossbar coupler |
| 315 | crossbar pins |
| 320 | pin notches |
| 322 | pin clips |
| 325 | double arrow |
| 330 | hinge |
| 332 | ball joint |
| 335 | seat clip openings |
| 340 | seat clips |
| 345 | seat latch mechanism |
| 405 | backrest hinge |
| 406 | hinge arms |
| 407 | child back surface |
| 408 | child seat surface |
| 410 | child harness |
| 415 | child belts |
| 420 | buckles |
| 425 | belt grooves |
| 430 | belt openings |
| 435 | buckle cavity |
| 505 | rotational double arrow |
| 605 | undercarriage side |
| 610 | belt guide system |
| 615 | belt shield |
| 620 | guide ribs |
| 625 | guide cavities |
| 900 | stretcher |
| 905 | child restraint pad |
| 910 | pad |
| 915 | double arrow |
| 920 | snap hook |
| 925 | frame |
| 930 | patient platform |
| 935 | lift system |
| 940 | first strap |
| 945 | second strap |
| 950 | buckle |
| 955 | indexing slots |
| 960 | child harness |
| 1000 | stretcher |
| 1002 | adult harness |
| 1005 | first strap |
| 1010 | second strap |
| 1015 | indexing bar |
| 1020 | indexing slots |
| 1025 | fastener |
| 1100 | stretcher |
| 1105 | pad cover |
| 1110 | arrow |
| 1115 | child restraint system |
| 1120 | first strap |
| 1125 | second strap |
| 1130 | buckle |
| 1200 | stretcher |
| 1205 | child restraint attachment |
| 1210 | snap hook |
| 1215 | first strap |
| 1220 | second strap |
| 1225 | buckle |
| 1300 | stretcher |
| 1305 | child restraint attachment |
| 1310 | fastening strap |
| 1315 | snap hook |
| 1320 | first strap |
| 1325 | second strap |

-continued

| Reference Numbers | |
|---|---|
| 1330 | buckle |
| 1335 | arrow |
| 1400 | stretcher |
| 1405 | child restraint system |
| 1410 | patient support assembly |
| 1415 | patient support strap |
| 1420 | first strap |
| 1425 | second strap |
| 1430 | buckle |
| 1500 | stretcher |
| 1505 | pad |
| 1600 | stretcher |
| 1605 | child restraint cover |
| 1610 | fastening strap |
| 1615 | snap hook |
| 1620 | first strap |
| 1625 | second strap |
| 1630 | buckle |
| 1635 | indexing slots |
| 1700 | stretcher |
| 1705 | pad |
| 1710 | pad restraint |
| 1715 | first strap |
| 1720 | second strap |
| 1725 | buckle |
| 1730 | arrow |
| 1800 | stretcher |
| 1805 | child restraint system |
| 1810 | frame-channel |
| 1815 | fastening strap |
| 1820 | first strap |
| 1825 | second strap |
| 1830 | buckle |
| 1835 | arrow |

The invention claimed is:

1. A system, comprising:

a stretcher having a patient platform;

wherein the patient platform has a backrest;

wherein the backrest is configured to support an adult;

wherein the backrest includes a child seat assembly;

wherein the child seat assembly includes a child restraint backrest and a child restraint seat connected to the child restraint backrest in a folding manner;

wherein the child seat assembly includes a harness configured to secure a child;

wherein the patient platform defines a child restraint cavity;

wherein the child seat assembly has a stowed position where the child restraint backrest is folded against the child restraint seat;

wherein the child restraint seat is received inside the child restraint cavity when in the stowed position;

wherein the child restraint backrest is flush with the patient platform when in the stowed position;

wherein the child seat assembly has a deployed position where the child restraint seat is folded away from the child restraint backrest;

wherein the child restraint seat is positioned outside of the child restraint cavity to rest against the patient platform when in the deployed position;

wherein the stretcher includes a hinge coupling the child seat assembly to the patient platform;

wherein the child seat assembly is configured pivot from the stowed position to outside of the child restraint cavity by pivoting about a first axis of the hinge;

wherein the child seat assembly is configured to rotate about a second axis of the hinge when outside of the child restraint cavity when moving between the stowed position and the deployed position; and wherein the second axis is transverse to the first axis.

2. The system of claim 1, further comprising:

a seat, wherein the seat is configured to support a buttocks of the adult; and wherein the child restraint seat is configured to rest against the seat the in the deployed position.

3. The system of claim 2, wherein the seat is coupled to the backrest.

4. The system of claim 1, wherein:

the backrest includes a pad; and the pad is configured to cover the child seat assembly when in the stowed position.

5. The system of claim 4, wherein the pad is configured to be rolled to expose the child seat assembly.

6. The system of claim 4, further comprising:

a leg rest configured to support legs of the adult; and wherein the pad is stored proximal the leg rest.

7. The system of claim 1, wherein the harness includes a first strap, a second strap, and a buckle configured to secure the first strap and the second strap.

8. The system of claim 1, wherein:

the stretcher includes a seat configured to support a buttocks of the adult;

the child restraint seat has one or more clip loops; and the clip loops extend from the child restraint seat to secure child restraint at to the seat when in the deployed position.

9. The system of claim 1, wherein:

the stretcher is a gurney; and the gurney includes a transport system and a lift system coupled between the patient platform and the transport system.

10. A system, comprising:

a stretcher having a patient platform;

a child restraint system being integrated in the patient platform;

wherein the child restraint system is configured to secure a child;

wherein the child restraint system includes a child restraint backrest and a child restraint seat connected to the child restraint backrest in a folding manner;

wherein the patient platform defines a child restraint cavity;

wherein the child restraint system has a stowed position where the child restraint backrest is folded against the child restraint seat;

wherein the child restraint seat is received inside the child restraint cavity when in the stowed position;

wherein the child restraint backrest is flush with the patient platform when in the stowed position;

wherein the child restraint system has a deployed position where the child restraint seat is folded away from the child restraint backrest;

wherein the child restraint seat is positioned outside of the child restraint cavity to rest against the patient platform when in the deployed position;

wherein the stretcher includes a hinge coupling the child restraint system to the patient platform;

wherein the child restraint system is configured pivot from the stowed position to outside of the child restraint cavity by pivoting about a first axis of the hinge;

wherein the child restraint system is configured to rotate about a second axis of the hinge when outside of the child restraint cavity when moving between the stowed position and the deployed position;

a pad configured to support an adult;

wherein the pad is configured to cover the child restraint system when the child restraint system is in the stowed position; and wherein the pad is configured to expose the child restraint system when the child restraint system is in the deployed position.

11. The system of claim 10, wherein the child restraint system includes a harness configured to secure the child.

12. The system of claim 11, wherein the harness includes a five-point harness.

13. The system of claim 10, wherein the pad is configured to be rolled to expose the child restraint system.

14. The system of claim 13, further comprising:

a leg configured to support legs of the adult; and wherein the pad is stored proximal the leg rest.

15. The system of claim 13, wherein:

the stretcher includes a seat configured to support a buttocks of the adult;

the child restraint seat has one or more clip loops; and the clip loops extend from the child restraint seat to secure child restraint seat to the seat when in the deployed position.

16. The system of claim 10, wherein:

the stretcher is a gurney; and the gurney includes a transport system and a lift system coupled between the patient platform and the transport system.

17. A method, comprising:

pivoting a child restraint system from a stowed position inside a child restraint cavity of a stretcher, wherein the stretcher has a patient platform, wherein the child restraint system includes a child restraint backrest and a child restraint seat connected to the child restraint backrest in a folding manner, wherein the child restraint seat is received inside the child restraint cavity when in the stowed position, wherein the stretcher includes a hinge coupling the child restraint system to the patient platform, wherein the pivoting includes pivoting the child restraint system via the hinge about a first axis;

flipping the child restraint system to expose the child restraint seat by rotating, the child restraint system about a second axis via the hinge, wherein the second axis is transverse to the first axis;

unfolding the child restraint seat from the child restraint backrest to expose a harness; and securing a child in the harness of the child restraint system.

18. The method of claim 17, further comprising:

covering the child restraint system with a pad; and rolling the pad to expose the child restraint system.

* * * * *